United States Patent
Murarka et al.

(10) Patent No.: US 12,536,551 B1
(45) Date of Patent: Jan. 27, 2026

(54) ADAPTIVE COMMUNICATION PLATFORM USING REINFORCEMENT LEARNING

(71) Applicant: ExlService Holdings, Inc., New York, NY (US)

(72) Inventors: Puneet Murarka, Gurgaon (IN); Daniil Yakimenko, Newtown, PA (US); Sagain Saowaluck, Apex, NC (US); Dugald E. Wilson, Raleigh, NC (US); Prithviraj Dutta, Assam (IN); Garvit Airen, Rajasthan (IN); Vaibhav Sharma, Rajasthan (IN); Anuj Singh, New Delhi (IN); Sachin Subhash Chandran Nair, Kerala (IN)

(73) Assignee: ExlService Holdings, Inc., New York, NY (US)

(*) Notice: Subject to any disclaimer, the term of this patent is extended or adjusted under 35 U.S.C. 154(b) by 0 days.

(21) Appl. No.: 19/259,877

(22) Filed: Jul. 3, 2025

(51) Int. Cl.
  *G06Q 30/01* (2023.01)
  *G06N 3/092* (2023.01)

(52) U.S. Cl.
  CPC ............ *G06Q 30/01* (2013.01); *G06N 3/092* (2023.01)

(58) Field of Classification Search
  None
  See application file for complete search history.

(56) References Cited

U.S. PATENT DOCUMENTS

| | | | |
|---|---|---|---|
| 12,271,869 B2 * | 4/2025 | Leaman | G06F 16/2428 |
| 12,327,271 B2 * | 6/2025 | Blustein | G06N 3/084 |
| 2017/0048170 A1 * | 2/2017 | Smullen | H04L 67/02 |
| 2020/0053403 A1 * | 2/2020 | Singhai | G06N 5/01 |
| 2020/0084280 A1 * | 3/2020 | Malhotra | H04L 67/535 |
| 2020/0162612 A1 * | 5/2020 | Mullane | G06Q 30/0281 |
| 2020/0293621 A1 * | 9/2020 | Ayers | G06F 40/263 |
| 2022/0020034 A1 * | 1/2022 | Jain | G06N 3/0442 |
| 2022/0293107 A1 * | 9/2022 | Leaman | G10L 15/26 |
| 2023/0139811 A1 * | 5/2023 | Bothra | G16H 50/20 705/2 |
| 2024/0046040 A1 * | 2/2024 | Tobey | G06Q 30/0271 |
| 2024/0249307 A1 * | 7/2024 | Kalra | H04N 21/4666 |
| 2025/0225332 A1 * | 7/2025 | Wu | G06N 20/00 |
| 2025/0278577 A1 * | 9/2025 | Breitweiser | G06F 40/40 |

* cited by examiner

Primary Examiner — Jonathan C Kim
(74) Attorney, Agent, or Firm — Perkins Coie LLP

(57) ABSTRACT

A platform implements tensor-based reinforcement learning for communication channel optimization. Using an audio data feed, the platform generates a set of alphanumeric input features associated with an entity interaction. Using the features, a neural network generates a first node parameter set for a first node of a channel optimization map. The platform instantiates a communication session with a computing device via a communication channel indicated by communication channel parameter(s) in the first node parameter set. Using a timing parameter, a tone parameter, a content parameter, and/or a nudge parameter, an electronic message can be generated for transmission via the communication channel. Using the neural network, the platform processes feedback data received via the channel to generate a second node for the channel optimization map. Configuration of the neural network can be updated, using the feedback data, by applying reinforcement learning or another suitable technique.

18 Claims, 14 Drawing Sheets

US 12,536,551 B1

ADAPTIVE COMMUNICATION PLATFORM USING REINFORCEMENT LEARNING

TECHNICAL FIELD

The present disclosure generally relates to artificial intelligence/machine learning (AI/ML) based systems and autonomous or semi-autonomous agentic systems. More particularly, aspects of the present disclosure relate to adaptive communication platforms, such as customer journey management platforms using reinforcement learning, and/or multi-agent orchestration platforms, such as multi-agent digital contact frameworks.

BACKGROUND

Omnichannel customer outreach systems enable entities to connect with individuals through notifications delivered over communication channels, such as mail, email, and phone. These systems enable entities to proactively reach out to individuals, providing them with information, updates, and services. For instance, a utility company can use a customer outreach system to send reminders about upcoming bill payments. A financial institution can use such a system to notify customers about low account balances. However, conventional outreach systems often fall short, as they typically don't account for customer preferences or history of interactions when using specific communication channels. For instance, a particular individual may prefer receiving text reminders but instead may receive phone calls. Furthermore, rigid scripts and lack of interactivity can hinder effective communication with individuals, and the lack of real-time adaptability can make it difficult for entities to use notifications as vehicles to capture and respond to feedback or individual concerns. For example, a customer who receives an automated notification regarding a disputed charge may encounter significant delays in resolving the issue due to lengthy hold times or the necessity of leaving a message, thereby prolonging the resolution process and potentially exacerbating customer dissatisfaction. This can lead to frustration and a sense of disconnection among customers.

Figure 1:
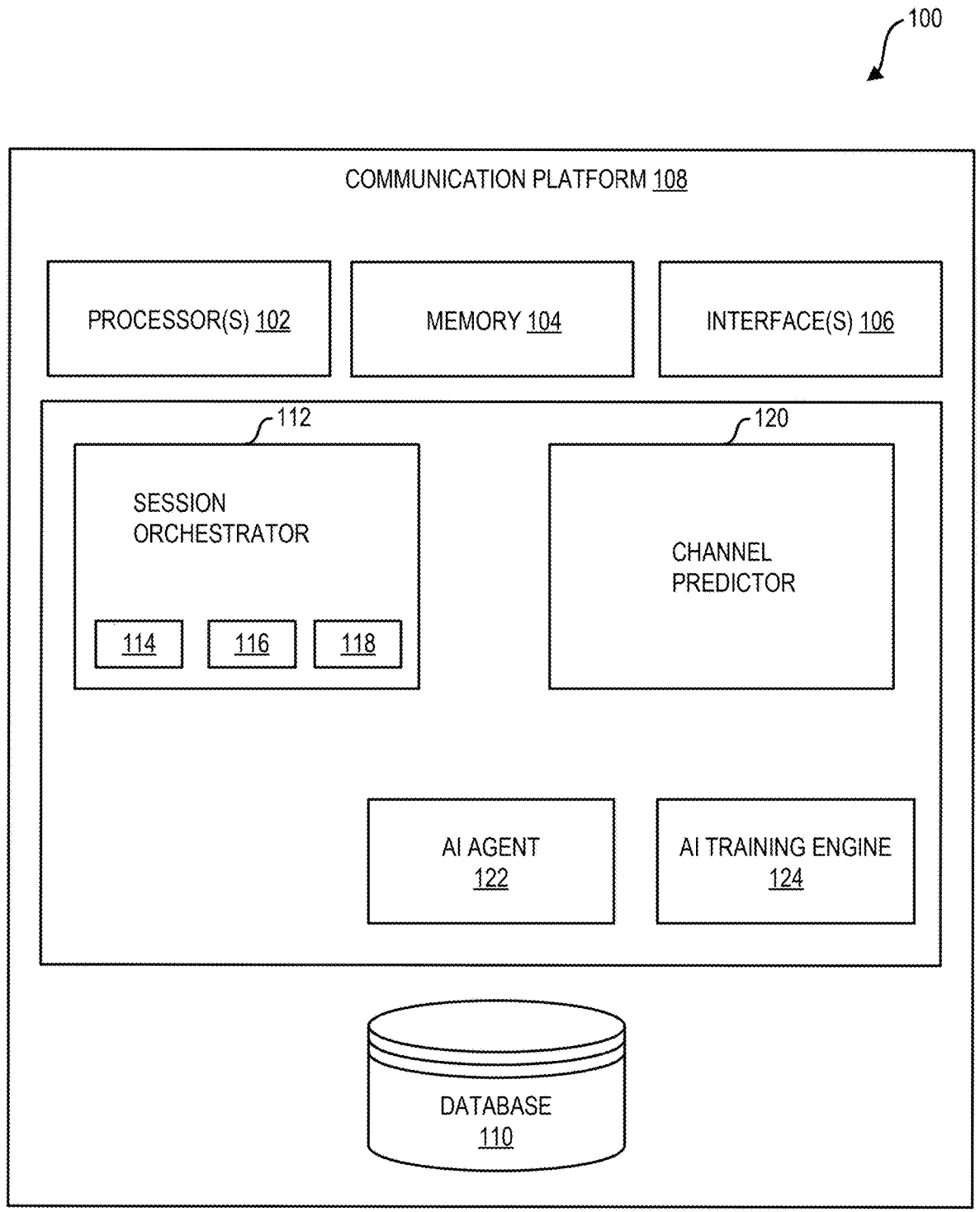
FIG. 1 illustrates an example communication platform, in accordance with some arrangements.

The drawings have not necessarily been drawn to scale. For example, some components and/or operations may be separated into different blocks or combined into a single block for the purposes of discussion of some of the embodiments of the disclosed system. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents and alternatives falling within the scope of the technology as defined by the appended claims.

DETAILED DESCRIPTION

The communication platform disclosed herein addresses the significant technical challenge of real-time processing and optimization of multi-channel customer communications. Conventional approaches struggle to handle the computational complexity of analyzing high-dimensional customer interaction data, predicting optimal communication channels, and generating personalized responses in real-time. The disclosed channel predictor and its tensor-based reinforcement learning system described herein enable efficient processing of complex, multi-dimensional data structures, allowing for dynamic channel optimization and generation of tailored communication strategies. This approach overcomes the limitations of traditional systems (for example, systems that rely solely on static rules for generating customer contact strategies), which cannot adapt quickly to changing customer behaviors and preferences across multiple communication channels. The tensor-based reinforcement learning system enables dynamic adaptation to shifting customer interaction patterns, ensuring optimal communication channel selection and personalized responses.

Furthermore, the techniques disclosed herein solve the technical problem of seamlessly integrating AI-driven decision-making with human-like communication in customer interactions through the described session orchestrator. The disclosed agent orchestrator tackles the problem of efficiently managing and coordinating multiple specialized agents, ensuring that the most appropriate agent handles each customer interaction. The guardrail orchestrator addresses the complex task of maintaining regulatory compliance across diverse communication channels and customer scenarios in real-time. The agent handover engine the technical challenge of seamlessly transferring context and control between different agents without disrupting the customer experience. According to various implementations, these components enable the communication platform to handle complex customer queries, switch between communication channels, and maintain conversation context while ensuring regulatory compliance. The tensor-based processing, reinforcement learning, and coordination techniques for specialized AI agents bounded by guardrails enable a level of computational efficiency and adaptability in customer communications that was previously unattainable using conventional methods.

For example, consider a customer who is overdue on a payment and receives a notification through their preferred messaging application. The communication platform's channel predictor analyzes the customer's interaction history and payment behavior, determining that a personalized phone call would be the most effective way to facilitate payment. The session orchestrator dynamically generates a channel recommendation, and the platform seamlessly switches the conversation to a voice call with an automated collections agent. The agent orchestrator coordinates with multiple specialized AI agents, each designed to handle specific aspects of the payment process, such as payment negotiations, payment processing, and follow-up communications. The guardrail orchestrator ensures that the AI agents' communications comply with relevant financial regulations and company policies. As the conversation progresses, the agent handover engine detects that the customer is willing to make a payment arrangement, and it seamlessly transfers the context and control to a specialized AI payment processing agent, which finalizes the payment details and provides confirmation to the customer. Throughout the conversation, the tensor-based reinforcement learning system continues to analyze the customer's behavior and preferences, adjusting the communication strategy in real-time to optimize the payment outcome. This integrated approach enables the company to provide a personalized and efficient payment experience while ensuring regulatory compliance and maximizing the likelihood of successful payment.

Adaptive Communication Platform

FIG. 1 illustrates an example communication platform 108, in accordance with some arrangements of the present disclosure. Communication platform 108 can perform dynamic channel optimization and agent orchestration operations, using reinforcement learning algorithms to generate and update channel optimization maps and decision criterion tensors. By analyzing input features reflective of customer behavior and preferences, communication platform 108 can dynamically optimize communication channels, using the insights gained from the tensor-based analysis and reinforcement learning. Communication platform 108 can switch between channels such as email, SMS, phone calls, and voice assistants, as well as more advanced channels like alerts delivered via wearable devices, augmented reality projections, virtual reality notifications, and the like smart home device notifications. Communication platform 108 can implement and manage agentic operations by deploying autonomous or semi-autonomous agents via the communication channels, implementing guardrails for agent operations, and orchestrating agent handover operations.

The communication platform 108 can use decision criterion tensors to perform reinforcement learning operations for generating and evolving channel optimization maps. As used herein, the term "tensor" refers to an N-dimensional array of numerical values, representing complex relationships between different variables or dimensions. A tensor can take various forms, including a scalar (a single number, or 0-dimensional tensor), a vector (a list of numbers, or 1-dimensional tensor), a matrix (a table of numbers, or 2-dimensional tensor), or a multi-dimensional array of numbers with three or more dimensions.

In use cases enabled by communication platform 108, tensors can enable generating and manipulating complex data structures and can be used to perform dynamic channel optimization and to generate a suitable channel mix (channel optimization map) based on features such as customer conversation history, communication history, loan attributes, risk scores, transaction history, product or service offer history, ad delivery history, policy information, public records, and the like. For example, a particular N-dimensional tensor can include N dimensions (e.g., risk classifications, behavior classifications, or other variables). Sets of points on the N dimensions can correspond to communication strategies S. Communication strategies S can include various parameters generated by the neural networks of the communication platform 108, such as timing, channels, message tone, message content, nudges (actionable items in notifications), and so forth.

The neural networks of the communication platform 108 can use reinforcement learning to collect features and generate communication strategies to evolve channel optimization maps. Through trial and error, the neural networks can learn to optimize the communication strategies by receiving feedback in the form of rewards or penalties based on user interactions. For instance, if a customer engages with a message sent via a particular channel, the neural network can receive a reward signal, indicating that the chosen channel was effective. Conversely, if a user ignores or dismisses a message, the neural network can receive a penalty signal, prompting it to adjust its strategy S, recommend a different communication channel, recommend a different timing of sending messages, recommend a different tone, recommend different content, recommend a different or additional nudge, and so forth.

By continuously updating the communication strategies based on user feedback, the neural networks can refine their decision-making processes and improve the effectiveness of the communication platform 108. For example, a particular communication strategy S can include parameters such as timing, channels (e.g., email, SMS, or phone calls), message tone (e.g., formal or informal), message content (e.g., promotional or informational), and nudge collection (e.g., a set of messages designed to encourage user engagement). As another example, a collections-focused communication strategy Sm can include parameters such as timing (e.g., sending reminders 3 days before payment due date), channels (e.g., prioritizing SMS for payment reminders), message tone (e.g., polite but firm), message content (e.g., including payment amount and due date), and nudge collection (e.g., sending a series of 3 timed reminders leading up to the payment due date).

Communication platform 108 can orchestrate the interactions across the optimized channels. In doing so, the platform can employ (e.g., generate, customize, modify, update, deliver, display) agentic user interfaces (AUIs) to provide personalized and proactive engagement with users. Agentic User Interface (AUI) is a type of interface that incorporates autonomous or semi-autonomous agents to interact with users. The agents, powered by software, AI, or a combination of both, can initiate interactions, anticipate user needs, and learn from behavior to adapt their responses. By proactively engaging with customers, agents can offer assistance, provide information, and perform tasks. AUIs of the communication platform 108 provide a more natural, intuitive, and efficient interaction experience, and can be applied in various domains, including customer service, healthcare, finance, and education. Examples of AUIs contemplated herein include virtual assistants, chatbots, personalized recommendation systems, and autonomous or semi-autonomous customer support agents. Some characteristics of AUIs are autonomy, proactivity, and adaptability, enabling agents to operate independently, anticipate user needs, and learn from behavior to improve the user experience. By incorporating agentic capabilities, user interfaces can become more user-friendly, efficient, and effective. This enables service entities that utilize communication platform 108 to deliver targeted and context-aware communications, improving user engagement and experience.

One or more user devices can be connected to the communication platform 108 through a network 104. User devices can include service entity devices, provider devices, and/or customer devices, as well as various intermediary devices. Example service entities include entities that operate and/or manage, at least in part, the communication platform 108, such as utility companies that use the platform to optimize outage notification channels, financial institutions that use the platform's AUIs to provide personalized account alerts, insurance companies that utilize the platform's channel projector to generate policy renewal reminders, and gaming companies that employ the platform's reinforcement learning algorithms to optimize in-game notification channels. By continuously learning from user interactions and adapting to changing preferences, the communication platform 108 can refine its channel optimization and agent orchestration operations, driving improved outcomes for both service entities and users.

In some arrangements, a particular user device can include, but not be limited to, a mobile, a laptop, a smart speaker, smart watch, smart glasses, etc. Further, the user device can include one or more in-built or externally coupled accessories including, but not limited to, a visual aid device such as a camera, audio aid, microphone, or keyboard. Further, the user device can include a mobile phone, smartphone, virtual reality (VR) devices, augmented reality (AR) devices, a laptop, a general-purpose computer, a desktop, a personal digital assistant, a tablet computer, and a mainframe computer. Additionally, input devices for receiving input from a user such as a touchpad, touch-enabled screen, electronic pen, and the like can be used.

In some arrangements, the network 104 can include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. The network 104 can also include, by way of example but not limitation, one or more of a wireless network, a wired network, an internet, an intranet, a public network, a private network, a packet-switched network, a circuit-switched network, an ad hoc network, an infrastructure network, a Public-Switched Telephone Network (PSTN), a cable network, a cellular network, a satellite network, a fiber optic network, or some combination thereof.

The communications platform 108 can include or access (e.g., at an external system, at a cloud-based system) one or more processors 102, one or more memory units 104, and one or more interfaces 106. The processors 102 can be configured to execute special-purpose computer-executable instructions stored in the memory units 104. The computer-executable instructions can invoke various other specialized hardware elements of the communication platform 108, such as graphics processing units (GPUs) for machine learning computations, tensor processing units (TPUs) for tensor operations, digital signal processors (DSPs) for signal processing, and field-programmable gate arrays (FPGAs) for accelerating specific tasks.

Furthermore, the communication platform 108 can also use application-specific integrated circuits (ASICs) designed to implement neural networks, such as neuromorphic chips that utilize neurons as memory units. These ASICs can mimic the behavior of biological neurons, enabling efficient and scalable implementation of neural networks. By using neurons as memory units, these ASICs can store and process information in a highly parallelized and distributed manner, reducing the need for traditional memory access and retrieval. This can result in significant improvements in processing speed, power efficiency, and scalability, making them well-suited for demanding applications such as real-time natural language processing, computer vision, and predictive analytics. The use of ASICs with neurons as memory units can enable the communication platform 108 to efficiently process complex neural networks, including recurrent neural networks (RNNs), convolutional neural networks (CNNs), and long short-term memory (LSTM) networks. This can enable the platform to perform advanced tasks such as speech recognition, sentiment analysis, and predictive modeling, and to provide personalized and context-aware communications to users. By using these specialized hardware elements, the communication platform 108 can deliver high-performance and efficient processing of complex data sets, enabling a wide range of applications and use cases.

The software, firmware, and/or hardware elements, such as those described herein, can implement various logics, modules, or engines of the communication system 108. Such modules can include, for example, a session orchestrator 112 (which can further include an agent orchestrator 114, a guardrail orchestrator 116, and an agent handover engine 118), a channel predictor 120, an AI agent 122, and/or an AI training engine 124. As used herein, the term "set" refers to a physical or logical collection of objects, which can contain no objects (e.g., a null set, an empty set), one object, or two or more objects. The terms "engine", "application", "program", "circuit" and "executable" refer to one or more sets of computer-executable instructions, in compiled or executable form, that are stored on non-transitory computer-readable media and can be executed by one or more processors to perform software- and/or hardware-based computer operations. The computer-executable instructions can be special-purpose computer-executable instructions to perform a specific set of operations, as defined by parametrized functions, specific configuration settings, special-purpose code, and/or the like. Engines, applications, programs and executables can generate and/or receive various electronic messages.

The session orchestrator 112 can manage the overall flow of electronic messages, coordinating the various components and engines to provide a seamless and personalized experience. By using the agent orchestrator 114, guardrail orchestrator 116, and agent handover engine 118, the session orchestrator can ensure that customer interactions are handled efficiently and effectively, while also ensuring compliance with relevant regulatory standards, such as the Fair Debt Collection Practices Act (FDCPA), the Telephone Consumer Protection Act (TCPA), the Gramm-Leach-Bliley Act (GLBA), and various state-specific debt collection laws and regulations. For example, in a collections scenario, the session orchestrator 112 can instantiate a dialer agent to initiate contact with a customer who has an overdue payment. The dialer agent can send an electronic message, such as a voice call or SMS, to the customer, while ensuring compliance with TCPA requirements for prior express consent. The guardrail orchestrator 116 can then apply policy rules to ensure that the dialer agent's message complies with FDCPA requirements, such as providing clear disclosure of the debt amount and the consumer's rights. The guardrail orchestrator 116 can also ensure that the dialer agent's message is handled in accordance with the customer's preferred communication channel, as specified under the GLBA. If the guardrail check indicates that the customer's account requires further action, the agent handover engine 118 can seamlessly transfer the interaction to a payment action agent, which can provide the customer with payment options and facilitate payment processing while maintaining confidentiality and security of customer information, as required by the GLBA and other privacy laws. If the customer expresses interest in a different action, such as disputing the debt, the agent handover engine 118 can transfer the interaction to a negotiation agent, which can engage in a negotiation dialogue with the customer while adhering to FDCPA guidelines on communication frequency and content. If the customer's account is flagged for bankruptcy, the agent handover engine 118 can transfer the interaction to a special queue agent, which can handle the account according to the organization's bankruptcy procedures and in compliance with applicable bankruptcy laws and regulations.

The agent orchestrator 114 can accept input features such as customer context, conversation history, and external data sources, and use this information to invoke and manage various executables that represent agents. During customer interactions, the agent orchestrator 114 can collect features such as customer responses, sentiment analysis, and conversation history, and use these features as input to a neural network (NN) model. The NN model can generate predictions about the customer's likelihood of payment, and the agent orchestrator 114 can use these predictions to determine the most effective communication strategy S. The agent orchestrator 114 can also use a channel optimization map to determine the most effective communication channels for customer interactions based on the customer's preferences and behavior. Furthermore, the agent orchestrator 114 can use a decision criterion tensor to generate and update channel optimization maps, by analyzing the outcomes of previous interactions and adjusting the tensor's weights and biases to optimize future interactions. For instance, the agent orchestrator 114 can use the decision criterion tensor to determine that customers with a high likelihood of payment are more likely to respond to email reminders, while customers with a low likelihood of payment require more assertive communication channels, such as phone calls.

The guardrail orchestrator 116 can serve as a policy rules engine, dynamically determining contextual information such as location, jurisdiction, and customer type (e.g., military personnel, elderly) for customer interactions. Based on this information, the guardrail orchestrator 116 can apply relevant policies and rules, ensuring that generated electronic messages and responses comply with regulatory requirements and organizational policies, such as the FDCPA's prohibition on harassment and the TCPA's restrictions on autodialed calls. For example, the guardrail orchestrator 116 can analyze a generated electronic message to ensure that it does not contain prohibited language or tone, and that it includes required disclosures and notices. The guardrail orchestrator 116 can also use natural language processing (NLP) to analyze generated electronic messages and detect potential compliance issues, such as overly aggressive language or unauthorized disclosure of customer information.

The agent handover engine 118 can enable real-time handover of communication sessions and context among agents, based on real-time customer interactions and transparently to the customer. This can be achieved by transferring contextual information, such as conversation history, customer preferences, and account status, between agents, ensuring that the handover process is seamless and efficient. For example, the agent handover engine 118 can use a shared memory architecture to store and retrieve contextual information, allowing agents to access and update customer data in real-time. The agent handover engine 118 can also use machine learning algorithms to determine the optimal agent to hand over to, based on factors such as agent expertise, customer behavior, and the nature of the customer's inquiry. For instance, if a customer is discussing a payment dispute, the agent handover engine 118 can hand over the interaction to a negotiation agent with expertise in debt resolution.

The channel predictor 120 can use machine learning models to predict the most effective communication channels for customer interactions based on input features such as customer preferences, context, and previous interactions. The channel predictor 120 can generate and update channel optimization maps, which can be used to determine the most effective communication channels for customer interactions. For example, the channel predictor 120 can use a channel optimization map that indicates the most effective communication channels for customers with different characteristics, such as age, location, and communication history. The channel predictor 120 can use this map to recommend communication channels for future interactions, such as email, SMS, or voice calls, and can continuously update the map based on new data and feedback.

The AI agent 122 can use neural networks and deep learning algorithms to enable downstream agentic communication operations, such as generating electronic messages, making decisions, and taking actions. The AI agent 122 can accept input features such as customer context, conversation history, and external data sources, and use this information to generate tailored responses and recommendations. The AI agent 122 can also use NLP to analyze customer messages and detect sentiment, intent, and preferences.

The AI training engine 124 can train and optimize the AI models used by the communication system 108, using large datasets and machine learning algorithms to improve model accuracy and effectiveness. The AI training engine 124 can use techniques such as reinforcement learning, supervised learning, and unsupervised learning to train AI models. For example, the AI training engine 124 can use reinforcement learning to train a model that predicts the most effective communication channels for customer interactions. The model can receive rewards or penalties based on customer responses, such as opening emails or responding to SMS messages. The input features collected by the agents, such as customer context, conversation history, and sentiment analysis, can be used to train the model. For instance, the agents can collect features such as customer ID, communication channel, message content, and customer response, which can be used to train the model to predict the most effective communication channels for future interactions. By continuously training and updating AI models using reinforcement learning and other techniques, the AI training engine 124 can ensure that the communication system 108 remains up-to-date and effective, even as customer behavior and preferences evolve over time. The AI training engine 124 can also use model pruning and knowledge distillation to optimize model performance and efficiency, ensuring that the models are lightweight and scalable for deployment in the communication system 108.

Agentic Operations

Figure 2:
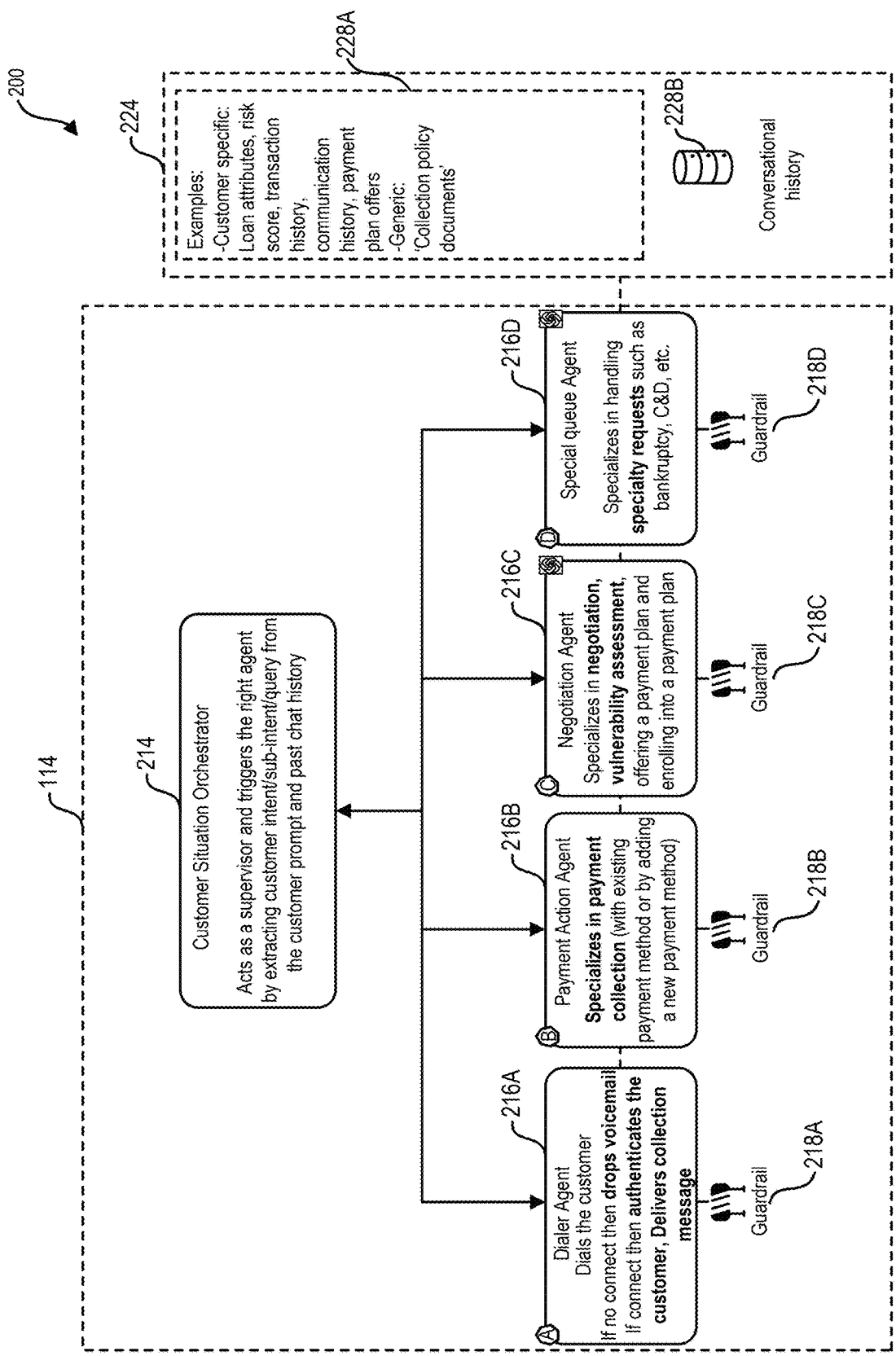
FIG. 2 illustrates an example architecture of an agent orchestrator of the communication platform, in accordance with some arrangements.

FIG. 2 illustrates an example architecture of an agent orchestrator 114 of the communication platform 108, in accordance with some arrangements. As used herein, the term "agent" and similar terms (e.g., "co-pilot", "logic") refer to entities that interact with their environment, process information, and/or take actions to achieve specific goals or objectives. An agent can be thought of as a software, firmware and/or hardware component that encompasses characteristics (e.g., traits, attributes, properties, and/or knowledge), states (e.g., user question or its derivatives, agent feedback), and/or agent interaction rules that govern its behavior and communication with other agents. The agent definitions can include references (e.g., programmatic bindings, function calls, local copies of) to AI models that define agents' decision-making processes and behaviors. Instantiating (spawning) an agent refers to the process of creating a new instance of an agent entity, class or object, which can involve allocating memory for the agent's data structures and variables, initializing agent attributes, setting up agent communication channels, and activating agent reasoning and decision-making mechanisms. This process can be compared to creating a new thread or process in a computer program, where the instantiated agent operates as a separate entity, executing autonomously and interacting with its environment and other agents. Depending on the implementation, agents can take various forms, such as executables running on physical and/or virtual machines and/or robotic agents interacting with physical environments. In some cases, agents can be instantiated as containerized applications, using technologies like Docker, or as serverless functions, utilizing platforms like AWS Lambda. Additionally, agents can be implemented using various programming paradigms, including object-oriented, functional, or logic-based programming, and can be designed to operate in diverse domains, such as e-commerce, healthcare, finance, or transportation.

Agents can use physical or virtualized resources (e.g., processors, memory, cache, communication interfaces, devices, databases, servers, components of the AI stack) in any suitable combination. Particular ones of such resources can be statically allocated or dynamically allocated at runtime (e.g., to a particular agent or group of agents for a duration of a simulation session or a set of simulation sessions). Particular ones of such resources can be dedicated, shared among agents, or shared between an agent and other processes. Various components of agents (e.g., models, data stores, executables) can be implemented across resources in a distributed manner. Accordingly, unless otherwise indicated by context or expressly noted, the terms "local" (as in "local agent") and "node" (as in "agent node") should not be automatically assumed to refer to a particular unitary physical resource.

Agent Orchestration

As shown, the agent orchestrator 114 can include a customer situation orchestrator 214, which can act as a supervisor and trigger an appropriate one of a set of agents by extracting customer intent, sub-intent, query and other suitable elements from a customer prompt. The set of agents can include specialized agents (216a, 216b, 216c, 216d), which can include associated guardrails (218a, 218b, 218c, 218d). For example, a dialer agent 216a can include dialer guardrails 218a; payment action agent 216b can include payment action guardrails 218b, negotiation agent 216c can include negotiation guardrails 218c, special queue agent 216d can include special queue guardrails 218d.

The agent orchestrator 114 can include a customer situation orchestrator 214 that acts as a supervisor and triggers an appropriate one of a set of agents by extracting customer intent, sub-intent, query and other suitable elements from a customer prompt through natural language processing (NLP) and machine learning algorithms. For example, the customer situation orchestrator 214 can use NLP to analyze the customer's language and tone, identifying key phrases, sentiment, and intent through techniques such as tokenization, where text is broken down into individual words or tokens. Tokenization can involve splitting sentences into words, such as "I'd like to pay my bill" being tokenized into ["I'd", "like", "to", "pay", "my", "bill"], or "I'm having trouble with my account" being tokenized into ["I'm", "having", "trouble", "with", "my", "account"]. The agents can be associated with attributes that can be semantically compared to the extracted tokens to determine the most suitable agent to handle a particular response. To enable semantic comparison, the customer situation orchestrator 214 can use vectorization techniques, such as word embeddings (e.g., Word2Vec, GloVe), to represent the tokens and agent attributes as vectors in a high-dimensional space. The similarity between the token vectors and agent attribute vectors can be calculated using metrics like cosine similarity, and a minimum threshold score (e.g., 0.7) can be set to determine whether the similarity is sufficient to trigger an agent. For instance, if the vector representation of the tokens ["pay", "bill"] has a cosine similarity score of 0.9 with the payment agent's attribute vector, and the score exceeds the minimum threshold, the customer situation orchestrator 214 can determine that the payment agent is the most suitable to handle the customer's request and trigger it to respond accordingly. This approach enables the agent orchestrator 114 to efficiently route customer interactions to the most suitable agent, ensuring effective and personalized communication.

Agent Guardrails

The set of agents can include specialized agents (216a, 216b, 216c, 216d), with associated guardrails (218a, 218b, 218c, 218d) that enforce policy information and contextual constraints. For instance, guardrails can include rules related to regulatory compliance, such as FDCPA guidelines on communication frequency and content, TCPA restrictions on autodialed calls, and GLBA requirements for customer data protection.

In an example, the dialer agent 216a can use dialer guardrails 218a to ensure compliance with FDCPA requirements by using a rules-based system that integrates with a customer database. When a customer is identified, the system retrieves their contact preferences and debt-specific restrictions from the database. A deterministic rules engine then evaluates these restrictions against the dialer agent's call list, filtering out any calls that would violate FDCPA guidelines. Additionally, a sentiment analysis model can be used to assess the customer's previous interactions and predict their likelihood of responding negatively to a call. The model can be configured with a thresholding mechanism, such that calls are initiated if the predicted sentiment score exceeds a certain confidence threshold (e.g., 80%). Furthermore, the model can be incrementally trained using specific outputs, such as customer feedback or call outcomes, to continuously improve its accuracy and adapt to changing customer behaviors. By combining these inputs and using confidence intervals (e.g., 95% confidence interval) to quantify uncertainty in the predictions, the dialer agent can make informed decisions about which calls to initiate, ensuring compliance and minimizing the risk of negative customer interactions.

The payment action agent 216b can use payment action guardrails 218b to handle sensitive customer information in accordance with GLBA requirements by employing a combination of encryption, tokenization, and access controls. When processing a payment, the payment action agent invokes a secure tokenization service to replace sensitive payment information with secure tokens, which are then used to retrieve payment information from a secure vault. A machine learning-based risk assessment model can evaluate the customer's payment history and detect potential security threats, such as suspicious payment patterns or unauthorized transactions. The model can be incrementally trained using a feedback loop that incorporates data from transaction outcomes, customer feedback, and security alerts, allowing it to adapt to changing payment patterns and emerging security threats. For example, the model can be trained to identify high-risk transactions based on factors like payment amount, frequency, and method, triggering additional verification steps like multi-factor authentication or manual review. By integrating these security measures with contextual information about the customer's payment history, the payment action agent can provide personalized payment options while maintaining confidentiality and security.

In an example, the negotiation agent 216c can use a natural language processing (NLP) model that analyzes the tone and sentiment of customer interactions to ensure respectful communication during debt negotiation. The NLP model's inputs include customer responses, such as text or speech, which are processed to extract features like sentiment scores (ranging from −1 to 1, where −1 indicates extreme negativity and 1 indicates extreme positivity), emotional cues (such as anger, frustration, or sadness), and tone (e.g., formal or informal). The model's outputs include sentiment classifications (e.g., positive, negative, or neutral, with confidence scores ranging from 0 to 100%) and tone assessments (e.g., angry, frustrated, or cooperative, with probabilities ranging from 0 to 1). These outputs inform the negotiation agent's communication strategy S, enabling it to adjust its language and approach in real-time to better match the customer's needs and preferences.

A classification model can also be used to predict the customer's likelihood of accepting a settlement offer based on their responses and historical data. This model's inputs include customer characteristics (such as debt amount, ranging from $100 to $10,000, and payment history, with scores ranging from 0 to 100), negotiation history (including number of previous negotiations, ranging from 0 to 5), and its outputs include a probability score indicating the likelihood of acceptance (ranging from 0 to 1, where 0 indicates low likelihood and 1 indicates high likelihood).

The models can be incrementally trained using a feedback loop that incorporates data from negotiation outcomes (such as acceptance rates, ranging from 0 to 100%), customer feedback (such as satisfaction scores, ranging from 1 to 5), and agent performance metrics (such as negotiation duration, ranging from 10 to 60 minutes). For example, the models can learn from successful negotiations, where customers accepted settlement offers (with acceptance rates above 70%), and from unsuccessful negotiations, where customers rejected offers or became agitated (with rejection rates above 30%). By continuously updating the models with new data, the negotiation agent can refine its communication strategy S and improve its effectiveness in negotiating with customers while adhering to FDCPA guidelines and avoiding aggressive or harassing language.

The special queue agent 216d can use special queue guardrails 218d to handle customer accounts flagged for bankruptcy by employing a decision tree-based system that integrates with a customer database and bankruptcy tracking system. When a customer account is flagged for bankruptcy, the system retrieves relevant information about the bankruptcy filing and applies a set of deterministic rules to determine the appropriate course of action. A machine learning-based classification model can predict the likelihood of the customer responding positively to different communication strategies, such as phone calls, emails, or letters, with confidence intervals (e.g., 95%) to quantify uncertainty. The model is incrementally trained using a feedback loop that incorporates data from customer responses, including positive reactions (e.g., response rates above 80% and satisfaction scores of 4.5/5) and negative reactions (e.g., response rates below 20% and satisfaction scores of 1/5). By combining these inputs and using confidence intervals, the special queue agent can provide sensitive and respectful communication, ensuring compliance with applicable bankruptcy laws and regulations.

Agent Handover

When agents hand over a communication session, they can utilize shared memory to transfer contextual information efficiently, including customer data and conversational history. A particular customer can be recognized by a unique identifier, such as a customer ID or account number, which can be used to access the customer's data stored in a database or data storage system. The customer situation orchestrator 214 can use this contextual information to determine the most effective communication strategy S for the customer, and the guardrails can ensure that the agents adhere to policy requirements and contextual constraints during the handover process. By accessing and updating contextual information in real-time, agents can provide seamless and efficient handover of customer interactions.

In handing over a communication session, an example technical implementation is through cached memory, where a shared cache layer stores the contextual information, allowing agents to access and update the data quickly. For example, agents can use a distributed caching system like Redis or Memcached to store and retrieve contextual information. Another approach is to use pointers or references to shared memory locations, enabling agents to directly access and modify the data without the need for explicit data copying. This can be achieved through the use of shared memory APIs or libraries that provide pointer-based access to shared memory regions. Agents can also use function calls that include copies of data, such as serializing the contextual information into a message payload and passing it between agents through RPC (Remote Procedure Call) or message queueing systems like RabbitMQ or Apache Kafka. Additionally, agents can use shared memory regions implemented using technologies like POSIX shared memory or Windows shared memory, where agents can map the shared memory region into their own address space and access the data directly. Other techniques include using message passing interfaces (MPI) or actor-based models, where agents can send and receive messages containing contextual information, allowing for efficient and scalable handover between agents. By utilizing these shared memory techniques, agents can ensure seamless and efficient handover of communication sessions, enabling a smooth and continuous interaction with customers.

Agents can utilize shared memory to transfer contextual information efficiently, such as customer context, conversation history, and sentiment analysis. For example, the agent orchestrator 114 can store this information in a shared memory region accessible by multiple agents, implemented using technologies like Redis or Memcached. The agent handover engine 118 can then use pointers or references to the shared memory location or function calls with serialized data to transfer the information between agents. By using shared memory and efficient data transfer mechanisms, agents can ensure seamless and efficient handover of customer interactions while maintaining compliance with regulatory requirements and organizational policies.

Agent Communication Framework

Figure 3:
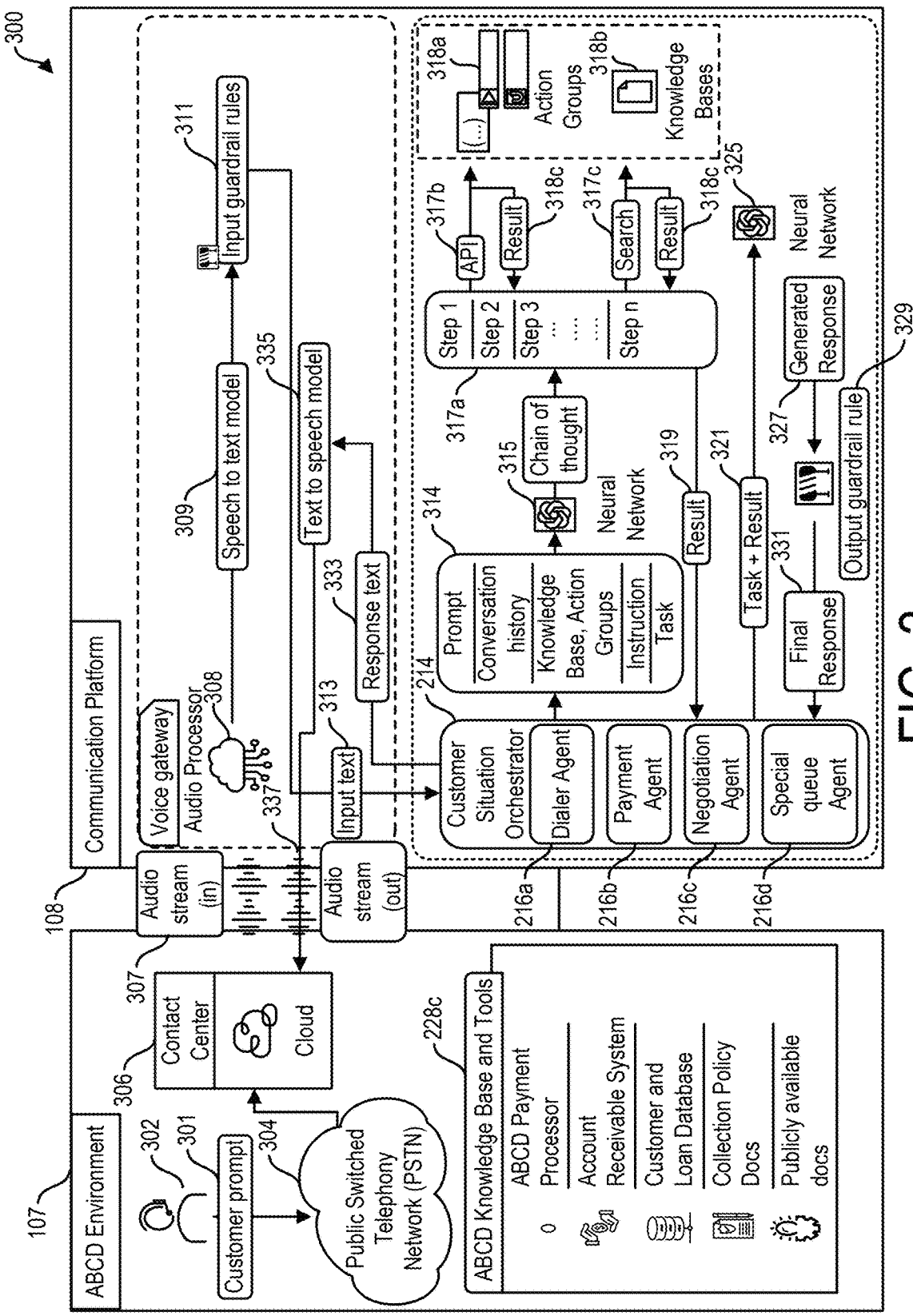
FIG. 3 illustrates an example flow of electronic messages enabled by the communication platform, in accordance with some arrangements.

FIG. 3 illustrates an example flow of electronic messages enabled by the communication platform 108. This flow supports various voice interactions, including those via telephony systems, such as voice-based AI interactions. Voice-based AI systems include IVR (Interactive Voice Response) systems, which are automated voice systems that interact with users through voice commands and responses. Additionally, voice assistants like Amazon Alexa, Google Assistant, and Apple Siri are AI-powered systems that can understand voice commands and respond accordingly. Furthermore, conversational AI systems can engage in natural-sounding conversations with users, often using voice as the primary interface.

As shown, the communication platform 108 can manage customer interactions across various channels. The environment 107 represents a customer-facing interface where prompts 301 can originate, for example, as voice calls through the public switched telephony network 304, digital interactions via the contact center cloud 306, and so forth. Voice calls are processed by the audio processor 308 and/or speech-to-text model 309, which can convert spoken language into text for further analysis. The audio processor 308 performs noise reduction, audio normalization, and signal enhancement to improve the quality of the incoming audio stream 307. The speech-to-text model 309 can be implemented through various natural language processing techniques, such as tokenization, part-of-speech tagging, and parsing, to accurately transcribe spoken language. Additionally, the model may employ deep learning architectures, including recurrent neural networks (RNNs) or transformer models, to learn complex patterns in audio data and generate precise text outputs. Input guardrail rules 311 are applied to ensure compliance and maintain quality standards before the interaction proceeds. These rules can act as a first line of defense against potential violations of regulatory requirements or company policies.

The customer situation orchestrator 214 analyzes the customer's input and context to route interactions to appropriate specialized agents 216*a-d*. These agents are designed to handle specific tasks and can be implemented in various forms, including containerized applications using technologies like Docker, serverless functions utilizing platforms like AWS Lambda, or as executables running on physical or virtual machines. Agents can also be implemented using different programming paradigms such as object-oriented, functional, or logic-based programming, depending on the specific requirements of the task they are designed to perform.

The dialer agent 216*a* manages outbound calls, optimizing contact strategies and ensuring compliance with calling regulations. The dialer agent 216*a* can utilize predictive dialing algorithms to determine optimal calling times based on historical data and customer preferences. It can also implement call throttling mechanisms to prevent excessive outbound calls to the same customer within a specified timeframe, thereby maintaining compliance with regulatory requirements. The dialer guardrails 218*a* ensure compliance with regulations such as FDCPA requirements by using a rules-based system that integrates with a customer database. For example, when a customer is identified, the communication platform 108 can retrieve customer contact preferences and debt-specific restrictions from the database. A deterministic rules engine then evaluates these restrictions against the dialer agent's call list, filtering out any calls that would violate FDCPA guidelines.

The payment agent 216*b* processes payments, handles billing inquiries, and assists with financial transactions. This payment agent 216*b* can integrate with payment processors to offer customers various payment options, including credit cards, ACH transfers, and digital wallets. It can also implement secure tokenization methods to protect sensitive payment information. The payment action guardrails 218*b* can handle sensitive customer information in accordance with regulatory requirements, such as GLBA requirements, by employing a combination of encryption, tokenization, and/or access controls. When processing a payment, the payment agent 216*b* invokes a secure tokenization service to replace sensitive payment information with secure tokens, which are then used to retrieve payment information from a secure vault.

The negotiation agent 216*c* handles disputes, facilitates settlements, and works on resolving customer issues. This negotiation agent 216*c* can employ negotiation strategies based on customer history, account status, and/or predefined settlement parameters. It can also utilize sentiment analysis to gauge customer receptiveness to different negotiation approaches and adjust its strategy accordingly. The negotiation guardrails 218*c* can use a natural language processing (NLP) model that analyzes the tone and sentiment of customer interactions to ensure respectful communication during debt negotiation. The NLP model processes customer responses to extract features like sentiment scores, emotional cues, and tone, which inform the negotiation agent's communication strategy, enabling it to adjust its language and approach in real-time.

The special queue agent 216*d* manages complex cases that require escalated attention or specialized knowledge. This agent can handle bankruptcy cases by implementing specific protocols that comply with applicable bankruptcy laws. It can also manage accounts with unique circumstances, such as military personnel protected under the Servicemembers Civil Relief Act, applying appropriate interest rate reductions and other protections. The special queue guardrails 218*d* handle customer accounts flagged for bankruptcy by employing a decision tree-based system that integrates with a customer database and bankruptcy tracking system. When a customer account is flagged for bankruptcy, the system retrieves relevant information about the bankruptcy filing and applies a set of deterministic rules to determine the appropriate course of action.

These agents can use a knowledge base 314 containing historical conversation data, action groups, and/or scenario instructions. This repository enables the agents to provide context-aware, personalized responses by drawing on past interactions, predefined action sequences, and specific guidelines for various scenarios.

The communication platform 108's neural networks 315, 325 can process inputs and generate responses through a sophisticated chain of thought process 317*a-n* that mimics human reasoning. The neural network 315 performs initial processing of customer inputs, extracting key features and intent from the text. Neural network 325 handles response generation based on the processed input and contextual information. This multi-step reasoning enables the communication platform 108 to provide comprehensive, contextually appropriate responses rather than generic answers. The chain of thought process can include various reasoning patterns such as deductive reasoning, where the communication platform 108 starts with general principles and applies them to specific customer situations; inductive reasoning, where the communication platform 108 identifies patterns from specific customer interactions to form general conclusions; and/or abductive reasoning, where the communication platform 108 generates the most likely explanation for a customer's issue based on available information.

In an example use case, when handling a payment inquiry, the communication platform 108 identifies account status and balance by querying the customer's account information from the database, retrieving current balance, payment due date, and account standing. This step ensures that the communication platform 108 has accurate financial information before proceeding with the interaction. The communication platform 108 checks payment history by analyzing the customer's previous payment patterns, including payment amounts, frequencies, and methods. This historical analysis helps the communication platform 108 understand the customer's payment behavior and identify potential issues or opportunities for improvement. The communication platform 108 assesses hardship program eligibility by evaluating the customer's financial situation against predefined criteria for hardship assistance. This assessment considers factors such as income, expenses, and extenuating circumstances that can qualify the customer for special payment arrangements or financial assistance programs. The communication platform 108 evaluates payment options by considering the customer's payment history, current financial situation, and available payment methods. This evaluation helps the communication platform 108 recommend the most suitable payment options for the customer, such as one-time payments, installment plans, or automatic recurring payments. The communication platform 108 considers regulatory requirements by checking applicable laws and regulations based on the customer's location, account type, and specific situation. This consideration ensures that the communication platform 108's responses and recommendations comply with relevant legal and regulatory frameworks, such as the Fair Debt Collection Practices Act or the Truth in Lending Act. The communication platform 108 formulates a personalized response by combining the insights gained from the previous steps with the customer's communication preferences and history. This formulation results in a tailored response that addresses the customer's specific needs and circumstances, enhancing the relevance and effectiveness of the communication.

In some implementations, the communication platform 108 includes necessary disclosures while maintaining a conversational tone by integrating required legal notices and disclaimers into the response in a natural and understandable manner. This integration ensures compliance with disclosure requirements without disrupting the flow of the conversation or overwhelming the customer with technical language.

The platform's API and search modules (317b, 317c) connect to external action groups 318a and/or knowledge bases 318b, which enables real-time interaction with external systems, databases, and services. APIs 317b enable data exchange and trigger actions in other systems, such as checking credit scores or initiating payments. Search 317c capabilities retrieve information from customer records, product catalogs, or policy documents, ensuring that agents have access to the most up-to-date and relevant information during interactions. The retrieval-augmented generation (RAG) approach enhances the system's capabilities by dynamically accessing and incorporating information from customer knowledge bases. For instance, when a customer inquires about a specific policy provision, the system can retrieve the relevant policy document, extract the pertinent clause, and incorporate it into the response. Similarly, when discussing account-specific details, the system can access the customer's transaction history to provide accurate information about recent activities or outstanding balances.

External connections can extend the platform's capabilities beyond internal resources. Action groups can execute predefined operation sequences in external systems, automating complex processes and ensuring consistency in handling specific scenarios. Knowledge bases provide access to structured and unstructured data, including FAQs, troubleshooting guides, and best practices, enhancing the system's ability to address a wide range of customer inquiries. The RAG approach can also be utilized to access domain-specific knowledge repositories, such as legal databases for compliance verification, medical information for healthcare-related inquiries, or technical documentation for product support. Additionally, the system can leverage RAG to incorporate real-time market data, weather information, or news updates when relevant to the customer interaction, providing contextually rich and timely responses.

Before delivering the final response, the communication platform 108 applies output guardrail rules 329 to ensure compliance, consistent tone, and/or inclusion of necessary disclosures or disclaimers. The final response generation 331 combines all processed information into a coherent, contextually appropriate message. This set of operations helps maintain quality control and mitigates risks associated with providing inaccurate or non-compliant information to customers. The guardrail orchestrator 116 serves as a policy rules engine, dynamically determining contextual information such as location, jurisdiction, and customer type for customer interactions. Based on this information, the guardrail orchestrator 116 applies relevant policies and rules, ensuring that generated electronic messages and responses comply with regulatory requirements and organizational policies, such as the FDCPA's prohibition on harassment and the TCPA's restrictions on autodialed calls.

In some implementations, the communication flow integrates with the knowledge base and tools 228c, providing access to real-time data from payment processors, account systems, and policy documentation. This integration ensures that agents have the most current information during customer interactions, enabling them to provide accurate and timely assistance. When agents hand over a communication session, they utilize shared memory to transfer contextual information efficiently, including customer data and conversational history. The agent handover engine 118 enables real-time handover of communication sessions and context among agents, based on real-time customer interactions and transparently to the customer. This is achieved through various technical implementations such as cached memory, where a shared cache layer stores the contextual information, allowing agents to access and update the data quickly. The agent handover engine 118 can use a shared memory architecture to store and retrieve contextual information, allowing agents to access and update customer data in real-time. The agent handover engine 118 can also use machine learning algorithms to determine the optimal agent to hand over to, based on factors such as agent expertise, customer behavior, and the nature of the customer's inquiry. For instance, if a customer is discussing a payment dispute, the agent handover engine 118 can hand over the interaction to a negotiation agent with expertise in debt resolution.

Channel Projection Techniques for the Agent Communication Framework

Figure 4:
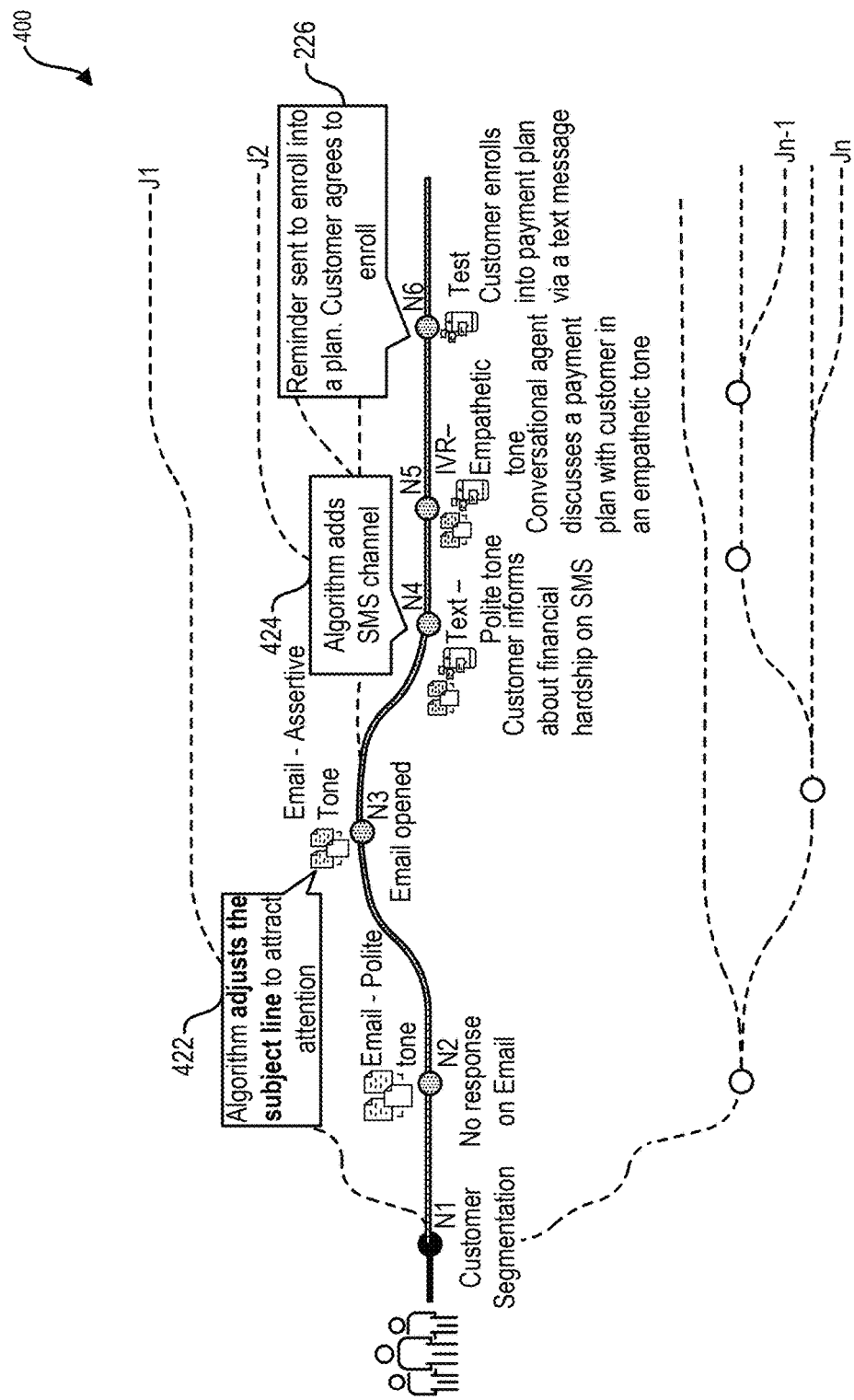
FIG. 4 illustrates an example channel optimization map generated by the channel predictor of the communication platform, according to some arrangements.

FIG. 4 illustrates an example channel optimization map 400 generated by the channel predictor 120 of the communication platform 108, according to some arrangements. As shown, the channel optimization map 400 can include a set of nodes N. The nodes N can correspond to decision points about the next best communication channel to select for one or more next communication sessions with a customer. A particular set of communication channels on a path (e.g., N1, N2, N3, N4, N5, N6) can define a particular journey J. A particular journey J can be dynamically adjusted as a next best channel is determined and added to the path included in the journey J.

A particular node N can be generated by a neural network and/or by applying deterministic rules. For example, a first node N1 in a particular journey J can be generated by causing a neural network to execute by accepting a decision criterion tensor 500 as an input. Additionally or alternatively, the neural network can accept customer information (for example, information 224 and/or features such as customer conversation history, communication history, loan attributes, risk scores, transaction history, product or service offer history, ad delivery history, policy information, public records, and the like) that enables positioning the customer within dimensions of the decision criterion tensor 500. In some implementations, a pre-processing logic (e.g., deterministic rules, RAG technique, clustering technique, a classification model) is implemented to generate a customer position on the decision criterion tensor, and the determined customer position is provided to the neural network.

The neural network can utilize provided information to generate a recommendation (422, 424, 426), which can include a strategy S having various attributes such as timing, channels, tone, content, and nudges. The recommendation can be represented as a data structure, such as a JSON object, that specifies the details of the communication strategy S. For instance, the recommendation can suggest sending an email with a promotional offer and a call-to-action button, with a tone that can be empathetic and supportive.

Actionable nudges can be implemented by applying a RAG technique downstream to locate a path to an executable based on the NN-generated action recommendation. The neural network can be trained to generate a defined set of actions, such as "Email", "Text", "Phone Call", or "Notification", based on the customer's preferences and behaviors. A particular action can be associated with a set of corresponding nudges, which can include previously stored definitions that provide specific guidance on how to execute the action. For example, if the NN generates an action recommendation to send an "Email" to a customer about paying their bill, the RAG technique can retrieve the nudge definition for "Pay Bill Email" which can include a specific template, tone, and call-to-action. The nudge definition can include previously stored content, such as a subject line "Your bill is due", a body "Please pay your outstanding bill of $X by Y date", and a call-to-action "Pay Now". The RAG technique can then augment the nudge definition with customer-specific information, such as their name, bill amount, and due date. Finally, the RAG technique can generate the final email content, which can be sent to the customer. For instance, the final email content can look like this:

"Dear [Customer Name],

Your bill of $ [Bill Amount] is due on [Due Date]. Please pay your outstanding bill by the due date to avoid late fees. Click here to pay now: [Pay Now Button]

Best regards, [Company Name]".

The output of the neural network, along with additional information collected as the customer interacts with the system, can be utilized as an input feature to generate the next node. These features can be used to incrementally train the neural network using techniques such as online learning, transfer learning, or active learning. For example, the neural network can learn from customer responses to previous recommendations, such as acceptance rates, feedback, and sentiment analysis. By continuously updating the model with new data, the channel optimization map can adapt to changing customer behaviors and preferences, ensuring that the communication strategy S remains effective and personalized.

The output of the neural network, along with additional information collected as the customer interacts with the system, can be utilized as an input feature to generate the next node. These features can be used to incrementally train the neural network using techniques such as online learning, transfer learning, or active learning. For example, the neural network can learn from customer responses to previous recommendations, such as acceptance rates, feedback, and sentiment analysis. By continuously updating the model with new data, the channel optimization map can adapt to changing customer behaviors and preferences, ensuring that the communication strategy S remains effective and personalized.

Figure 5:
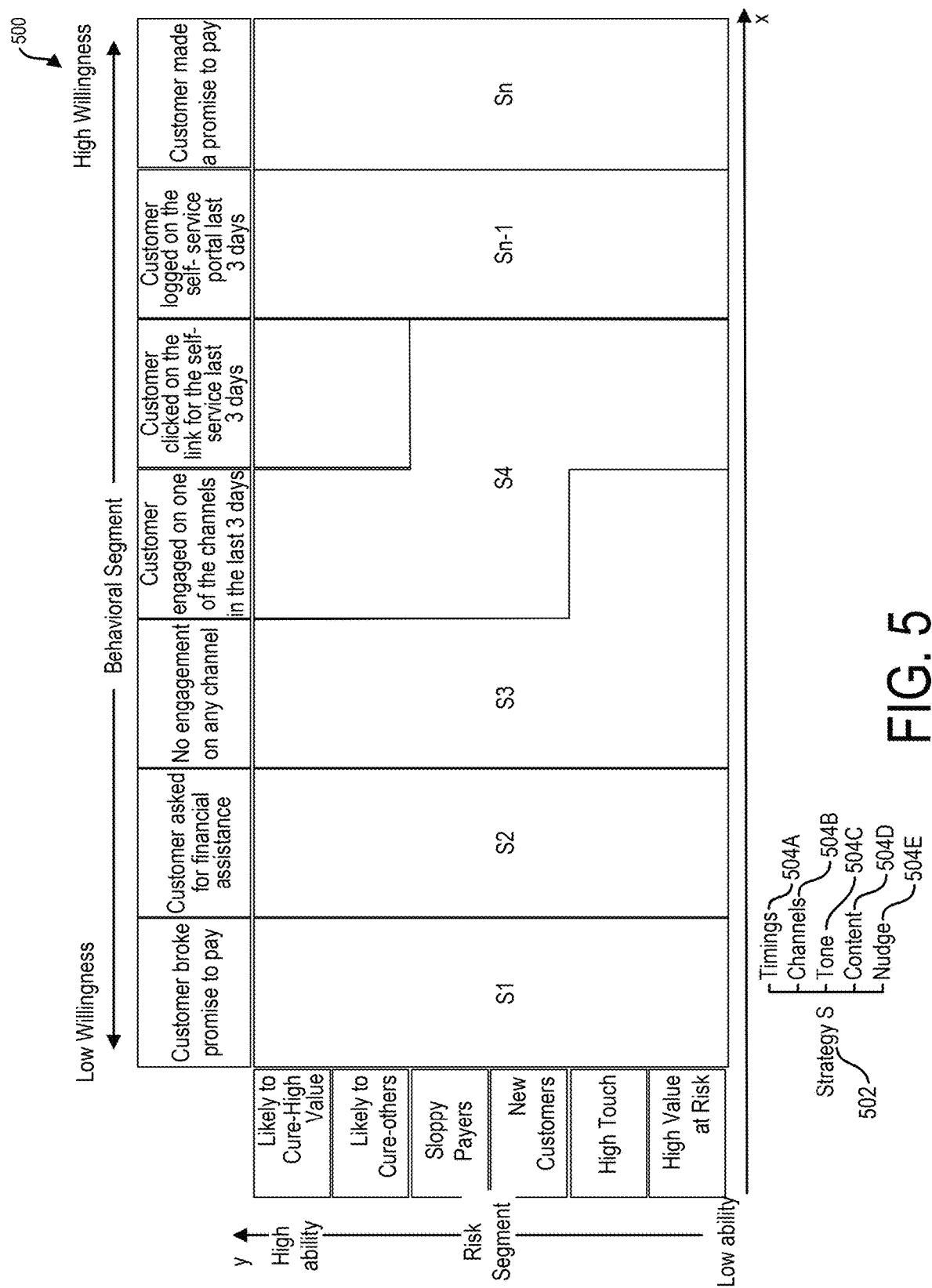
FIG. 5 illustrates an example decision criterion tensor for generating and updating channel optimization maps of the communication platform, according to some arrangements.

FIG. 5 illustrates an example decision criterion tensor 500, which can be implemented as a dimensional array (having 0 to N dimensions) that represents the decision-making framework for generating and updating channel optimization maps 400 of the communication platform 108. In use cases enabled by communication platform 108, tensors can enable generating and manipulating complex data structures and can be used to perform dynamic channel optimization and to generate a suitable channel mix (channel optimization map 400) based on features such as customer conversation history, communication history, loan attributes, risk scores, transaction history, product or service offer history, ad delivery history, policy information, public records, and the like. For example, a particular decision criterion tensor 500 can include N dimensions (e.g., risk classifications y, behavior classifications x, and/or other variables). Sets of points on the N dimensions can correspond to communication strategies S. Communication strategies S can include various parameters generated by the neural networks of the communication platform 108, such as timing 504*a* (daily, weekly, scheduled, due date minus N days, etc.), channels 504*b*, message tone 504*c*, message content 504*d*, nudges (actionable items in notifications) 504*e*, and so forth.

In some implementations, message content can be generated using stubs, which are pre-defined message templates that can be populated with customer-specific information, or using generative AI models that can create personalized and context-specific messages based on customer data and behavior. In some implementations, nudges can include generating and displaying a hyperlink to a relevant webpage or resource, invoking a chat session with an agent where the customer can be authenticated through one-time password (OTP) or other verification methods, sending reminders and notifications with actionable items such as "Pay Now" or "Update Your Information", or providing personalized offers and promotions based on customer behavior and preferences.

Figure 6:
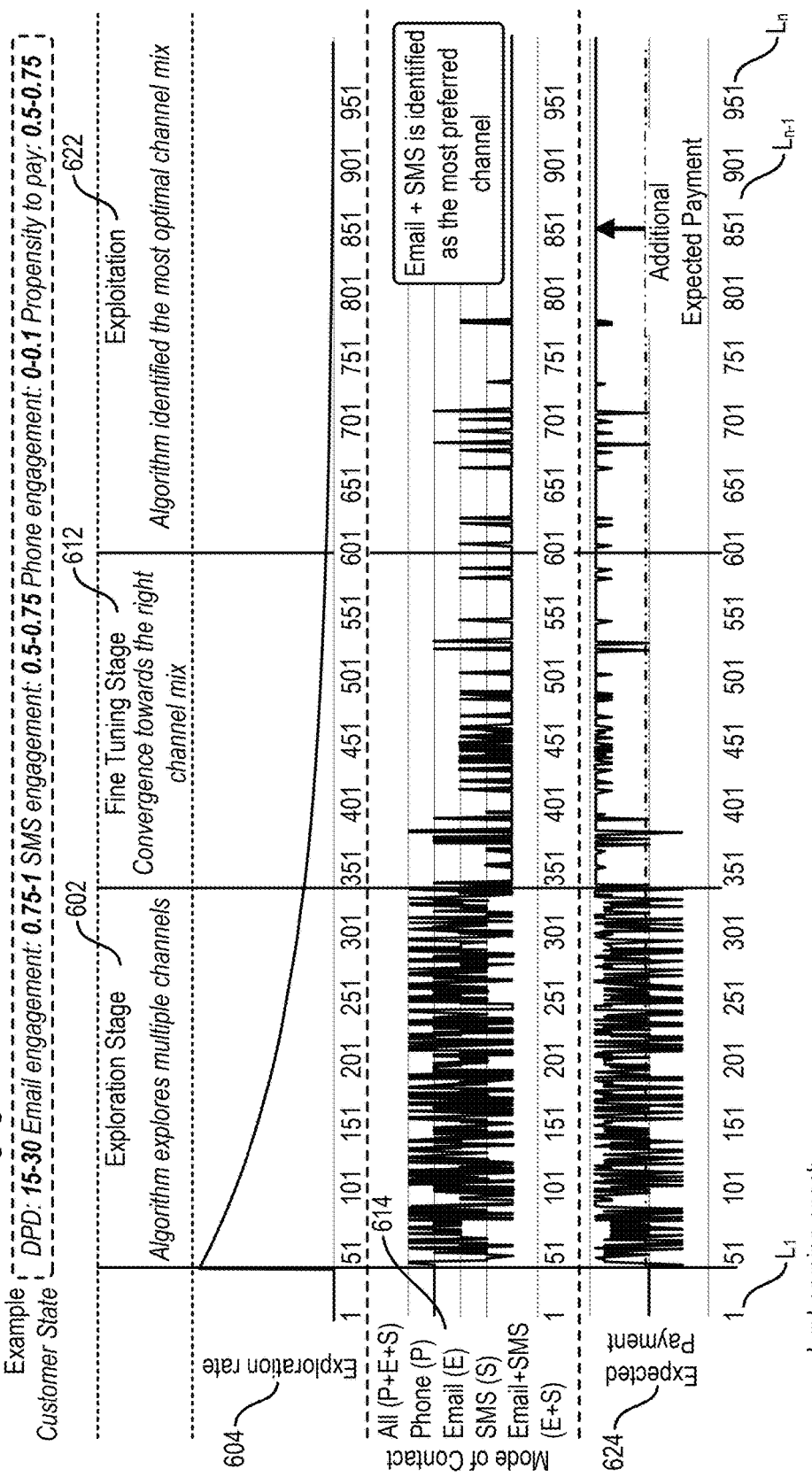
FIG. 6 illustrates aspects of an example reinforcement learning algorithm for neural networks of the communication platform, according to some arrangements.

FIG. 6 illustrates aspects of an example reinforcement learning algorithm 600 for neural networks of the communication platform 108. Reinforcement learning is a type of machine learning where a decision-making model learns to take actions in an environment to maximize a reward signal. In the context of channel optimization maps, the decision-making model can be the neural network generating recommendations, and the environment can be the customer interactions. The reinforcement learning algorithm 600 can be used to generate and tune channel optimization maps 400 by learning from customer responses to previous recommendations.

The algorithm 600 can include three stages: an exploration stage 602, a fine-tuning stage 604, and an exploitation stage 622, across learning epochs L. A learning epoch L represents a single iteration of training, where the algorithm learns from a batch of data. A learning epoch can include multiple iterations L1 through Ln, where the algorithm refines its parameters based on the feedback received. In the exploration stage 602, the algorithm explores different actions (e.g., sending emails, making phone calls) to learn about the customer's preferences and responses. The exploration rate determines the probability of taking a random action, rather than the recommended action. For example, an exploration rate of 0.2 means that the algorithm will take a random action 20% of the time.

In the fine-tuning stage 604, the algorithm fine-tunes its parameters based on the feedback received from customer interactions. This can involve adjusting the weights of the neural network to better predict the customer's responses. In the exploitation stage 622, the algorithm exploits its knowledge to take actions that maximize the expected reward. For example, if the algorithm has learned that sending emails is more effective than making phone calls for a particular customer segment, it will prioritize sending emails. The algorithm 600 can capture variables such as mode of contact 614, which refers to the channel used to communicate with the customer (e.g., email, phone, text (e.g., SMS, MMS, RCS, instant messaging, web-based messaging, over-the-top messaging such as iMessage and Google Messages)), and expected payment 624, which refers to the predicted likelihood of a customer making a payment based on the communication strategy.

The reinforcement learning algorithm 600 can be implemented using various neural network-based methods, such as Deep Q-Networks (DQN), Deep Deterministic Policy Gradients (DDPG), and Advantage Actor-Critic (A3C). In a DQN implementation, the algorithm can learn an optimal action-value function (Q-function) that predicts the expected reward for a given state-action pair, where the state comprises customer features including mode of contact 614 and expected payment 624, and the actions comprise different communication strategies. The Q-function can be learned using a neural network that takes the state and action as inputs and outputs the predicted reward, enabling the algorithm to select the action with the highest Q-value for a given state.

In a DDPG implementation, the algorithm can learn a continuous policy that maps states to actions, where the state comprises customer features including mode of contact 614 and expected payment 624, and the action comprises a continuous variable representing the frequency of communication. The policy can be learned using a neural network that takes the state as input and outputs the action, allowing the algorithm to adjust the frequency of communication based on the customer's preferences and predicted likelihood of payment.

In an A3C implementation, the algorithm can utilize multiple parallel models to asynchronously update a global model, where parallel models can learn from a different subset of customer interactions, such as different customer segments, interaction channels, or time periods. This approach can enable the algorithm to learn both the policy and value function simultaneously, with the policy model predicting the optimal actions and the value model estimating the expected reward. By using the parallel models, the A3C algorithm can efficiently learn and optimize communication strategies for individual customers, which can lead to improved outcomes and increased efficiency.

The goal of the reinforcement learning algorithm is to maximize the expected payment, targeting an average payment of $X to $Y per customer, while minimizing the exploration rate, targeting an exploration rate of 5% to 10%. By optimizing these objectives, the algorithm can learn to generate effective channel optimization maps that balance exploration and exploitation, ultimately driving business outcomes such as increased revenue and customer engagement.

The strategy S generated by the reinforcement learning model can include a range of variables, such as timing, channels, content, tone, and nudges, that are optimized to drive customer engagement and payment. For example, the model can learn to generate strategies such as: (1) Email+Urgent Tone: sending an email with an urgent tone to customers who have an outstanding payment due in the next 3 days; (2) Phone+Personalized Content: making a phone call with personalized content to high-value customers who have not made a payment in the past month; (3) Text+Reminder Nudge: sending a text message with a reminder nudge to customers who have a payment due date approaching; and (4) Email+Promotional Content: sending an email with promotional content to customers who have shown interest in a particular product or service. By generating these strategies, the reinforcement learning model can optimize the communication approach to individual customers, driving better outcomes and improving overall business performance.

When implementing a reinforcement learning model for a particular use case, such as optimizing communication strategies for a specific entity, several techniques can be employed to improve the model's performance. One approach is to utilize multi-model reinforcement learning, where multiple models learn to optimize different aspects of the communication strategy. For instance, one model could focus on channel selection, while another model focuses on timing and content. This can lead to more efficient exploration and improved overall performance, as a particular model can specialize in its respective area.

Another technique that can be applied is graph-based reinforcement learning. By representing information such as customer interactions, communication history, and payment outcomes (e.g., information 224 and/or features such as customer conversation history, communication history, loan attributes, risk scores, transaction history, product or service offer history, ad delivery history, policy information, public records, and the like) in graph form, the model can learn more complex patterns and relationships in the data. This graph representation can capture the relationships between customers, communication channels, and payment outcomes, allowing the model to make more informed decisions.

Agentic User Interface (AUI) Examples

Figure 7:
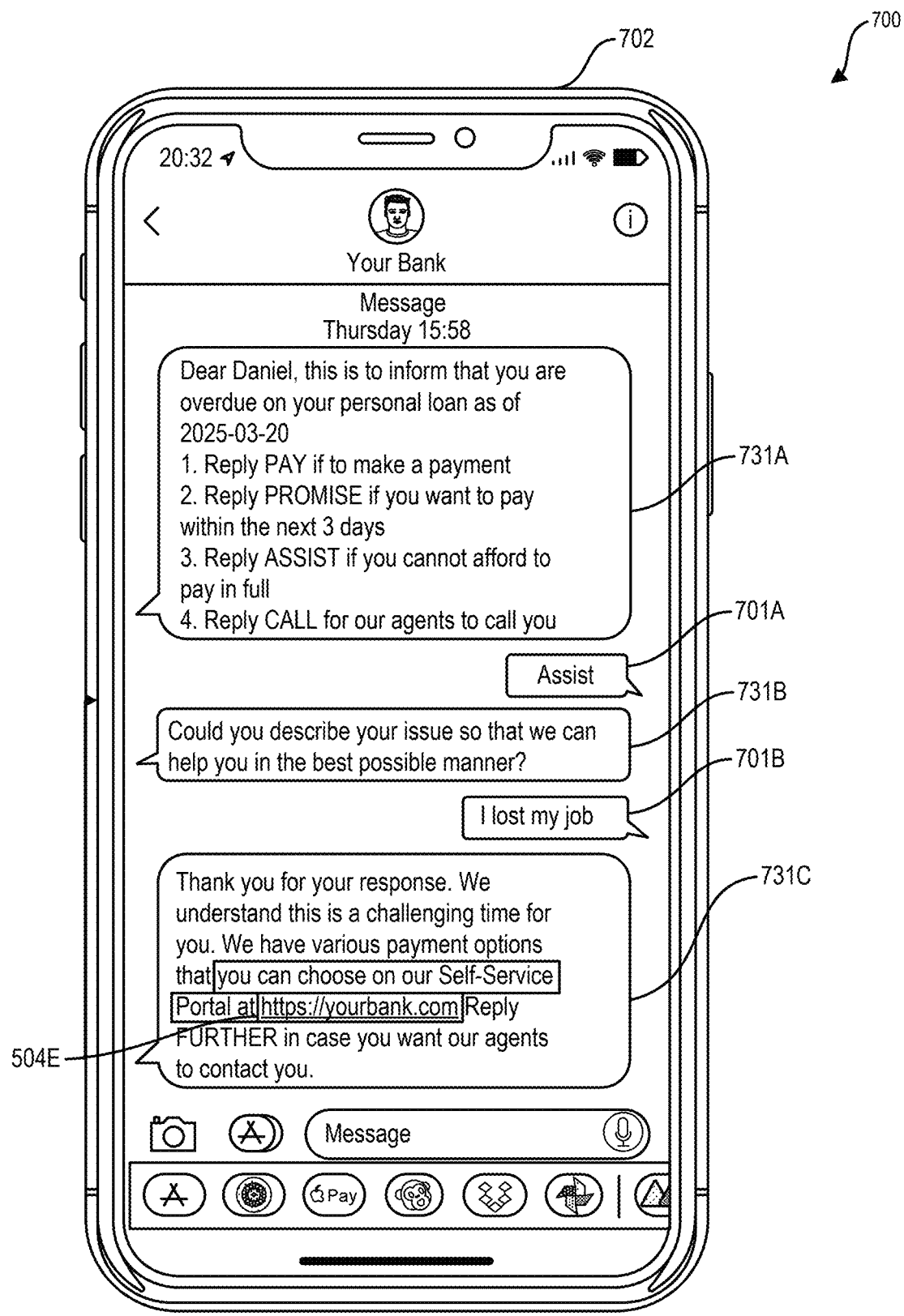
FIG. 7 is an example agentic user interface (AUI) that illustrates agentic interactions using the communication platform, according to some arrangements.

FIG. 7 is an example agentic user interface (AUI) 700 that illustrates agentic interactions using the communication platform 108, according to some arrangements. In an example, a particular channel optimization map 400 can include a recommendation for a text (e.g., SMS, MMS, RCS, instant messaging, web-based messaging, email messaging, over-the-top messaging such as iMessage and Google Messages) message to be sent. A customer can receive and open the text message at customer device 702. The text message can include a first message 731a, which can be structured to provide guidance on interaction options to the customer. Upon capturing a customer response 701a, the communication platform 108 can tokenize and analyze the response 701a and, based on the analysis, invoke a specialized agent (216a, 216b, 216c, 216d). The specialized agent (216a, 216b, 216c, 216d) can generate follow-up questions (731b, 731c), capture customer responses (701b), tokenize and analyze customer responses, perform computer-executable actions, perform agent handover operations, and so forth. In some implementations, agent output can include one or more nudges 504e, which can include hyperlinks generated in response to customer interactions.

The AUI 700 can be implemented in various forms to facilitate diverse interactions with customers. For instance, AUI 700 can be embodied as a chatbot integrated into a website or mobile application (e.g., as a chat), providing customers with a conversational interface to resolve queries and obtain support. In some implementations, AUI 700 can be implemented as a text (SMS, MMS, RCS, instant messaging, web-based messaging, email messaging, over-the-top messaging such as iMessage and Google Messages) message-based interface, where customers receive and respond to messages that are dynamically generated based on their interactions and preferences. In some implementations, AUI 700 can also be integrated into voice assistants, mobile apps, or social media platforms, allowing customers to interact with the system through different channels and modalities. These various implementations enable AUI 700 to provide a seamless and personalized experience to customers, regardless of the device or platform they use to interact with the system.

In some implementations, portions of the AUI 700 can be dynamically generated to capture multimodal interactions, such as customer interactions that may occur through text, voice, and/or integrated environments like email or CRM systems. For example, a customer may engage in a simultaneous interaction with multiple specialized agents through different channels, such as being in an active phone session with a special queue agent while also being on hold with a payment action agent in a chat interface. During the phone session, the special queue agent can provide guidance and support, while the payment action agent can concurrently work on setting up a payment plan with the customer through the chat interface. After the special queue agent completes the customer's inquiry, the customer can seamlessly transition to the payment action agent in the chat interface to finalize the payment plan, with AUI 700 dynamically generating prompts and responses to facilitate a cohesive and efficient interaction across both channels.

Example Operations of the Communication Platform

Figure 8:
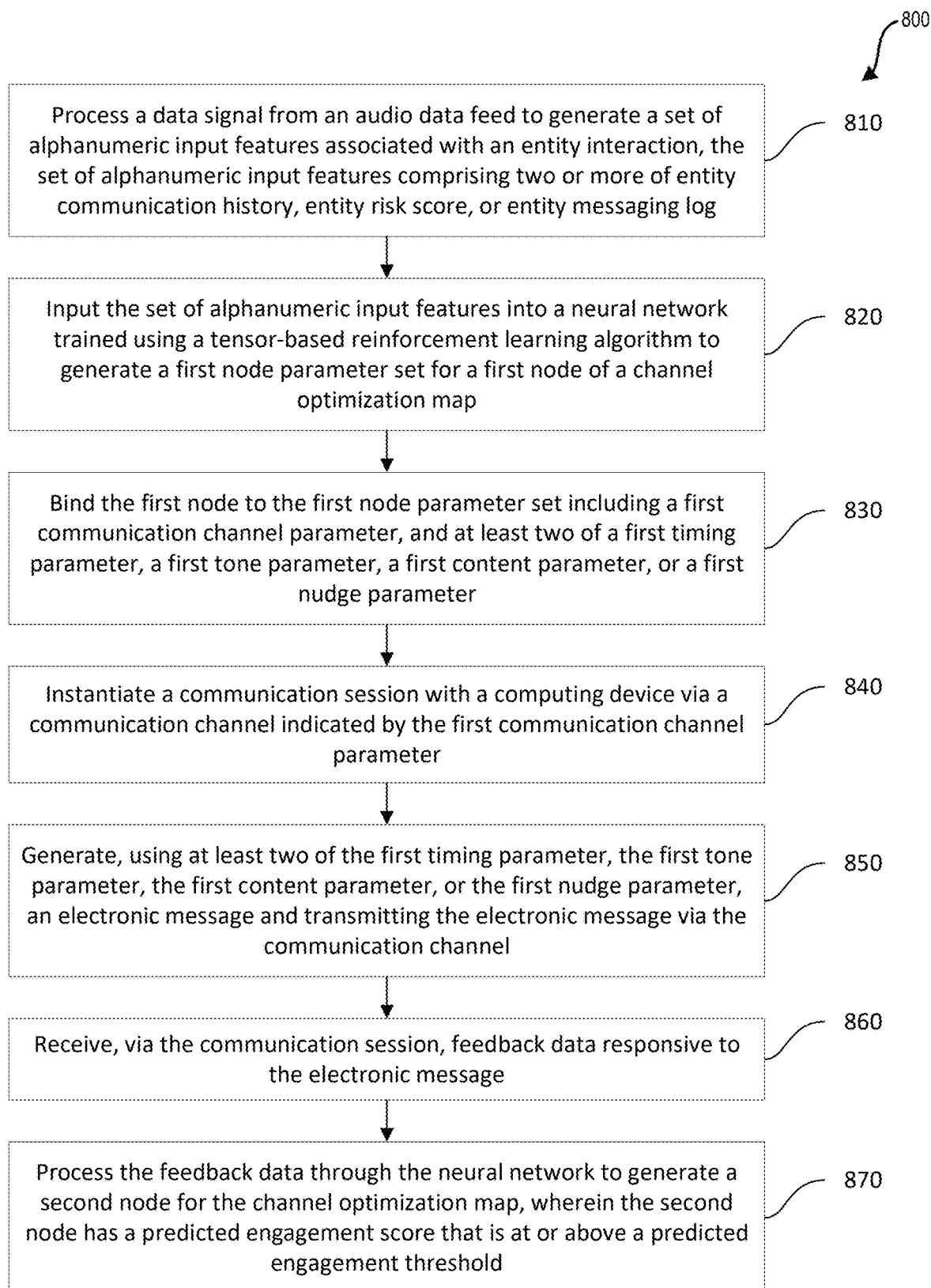
FIG. 8 is a flowchart illustrating example channel prediction operations, according to some arrangements.

FIG. 8 is a flowchart of an example method 800 for implementing a tensor-based reinforcement learning system for communication channel optimization. The method can be implemented by a computer system, such as a communication platform, that is configured to manage and orchestrate communication sessions with entities.

At 810, a data signal from an audio data feed is processed to generate a set of alphanumeric input features associated with an entity interaction. The set of alphanumeric input features can include two or more of entity communication history, entity risk score, or entity messaging log. In some aspects, the system can apply a Named Entity Recognition (NER) technique to extract an entity identifier from the audio data feed and generate one or more parameters based on guardrail information associated with the entity identifier.

At 820, the set of alphanumeric input features is input into a neural network trained using a tensor-based reinforcement learning algorithm. The neural network generates a first node parameter set for a first node of a channel optimization map. The tensor-based reinforcement learning system can utilize an N-dimensional tensor to generate and update the channel optimization map. The system can incrementally train the neural network by generating the N-dimensional tensor and updating the weights associated with the neural network nodes. The system can also generate the first node parameter set by analyzing entity responses to previous communications, predicting the likelihood of entity engagement, and automatically selecting a parameter with a predicted engagement score that meets or exceeds a predicted engagement threshold. The predicted engagement threshold can be a fixed value, a dynamic value based on entity behavior, a range, or a value determined by a machine learning model. The predicted engagement score can be a probability score, a ranking score, or a weighted score based on various engagement metrics.

At 830, the first node is bound to the first node parameter set, which includes a first communication channel parameter and at least two of a first timing parameter, a first tone parameter, a first content parameter, or a first nudge parameter. The first nudge parameter can include a navigable hyperlink, an electronic recommendation, or an electronic instruction.

At 840, a communication session is instantiated with a computing device via a communication channel indicated by the first communication channel parameter. The communication channel can be associated with an agentic communication session delivered via a graphical user interface or an audio interface of an entity computing device.

At 850, an electronic message is generated using at least two of the first timing parameter, the first tone parameter, the first content parameter, or the first nudge parameter, and transmitted via the communication channel.

At 860, feedback data responsive to the electronic message is received via the communication session.

At 870, the feedback data is processed through the neural network to generate a second node for the channel optimization map. The second node has a predicted engagement score that meets or exceeds a predicted engagement threshold. The predicted engagement threshold can be a threshold value, such as 0.5 or 0.8, or a dynamic threshold value based on entity behavior or context. The predicted engagement score can be compared to the predicted engagement threshold using various comparison operators, such as greater than, less than, or equal to. The system can generate an agentic user interface that enables interactive communication through a sequence of text messages or audio messages and dynamically update the interface based on real-time entity responses and the second node of the channel optimization map.

Figure 9:
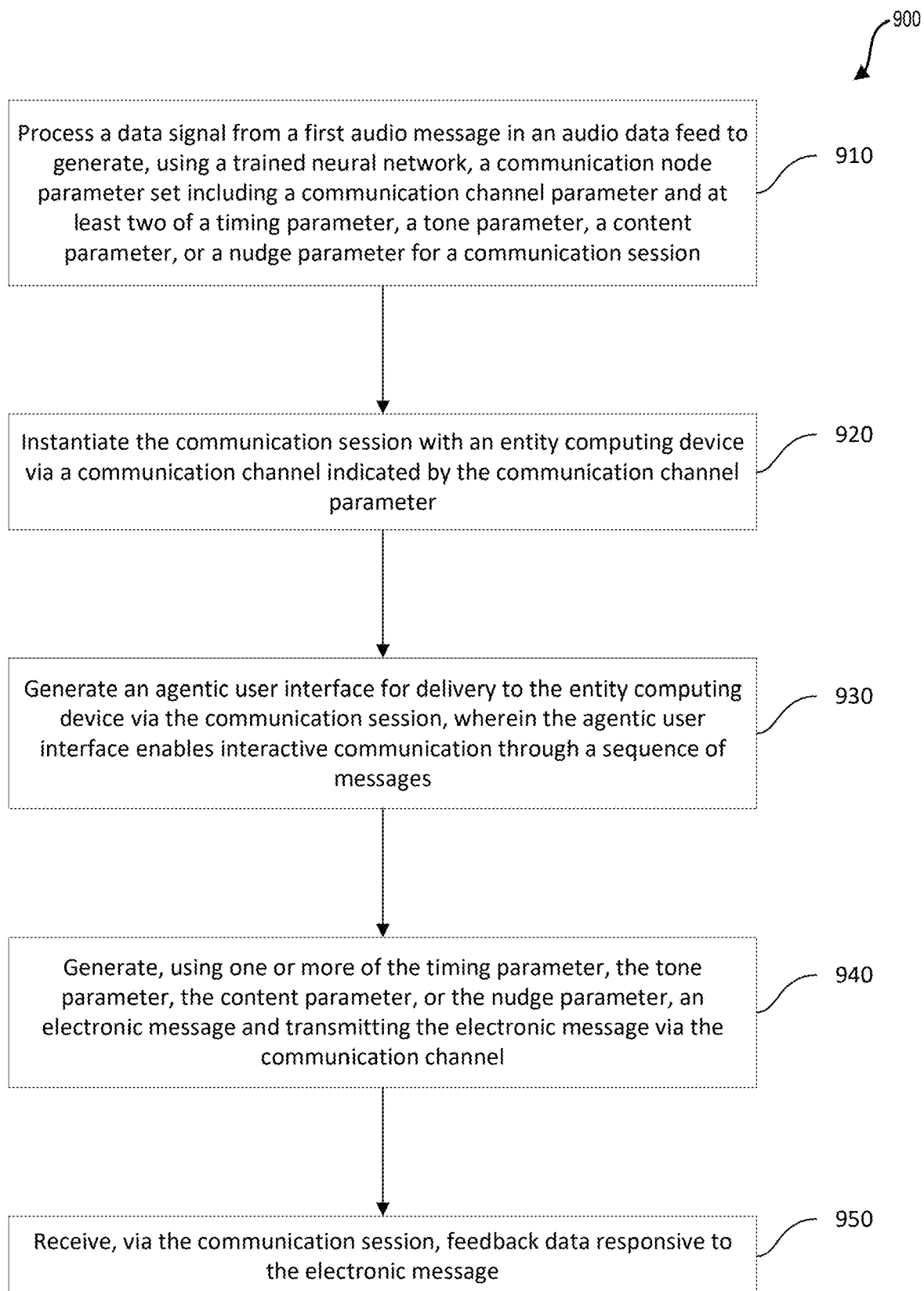
FIG. 9 is a flowchart illustrating example session orchestration operations, according to some arrangements.

FIG. 9 is a flowchart 900 illustrating example session orchestration operations, according to some arrangements. FIG. 9 is a flowchart 900 illustrating example session orchestration operations, according to some arrangements.

The session orchestration operations depicted in FIG. 9 enable dynamic and personalized communication sessions with entities, such as customers, using a combination of machine learning models and specialized agents.

At 910, a data signal from a first audio message in an audio data feed is processed to generate, using a trained neural network, a communication node parameter set including a communication channel parameter and at least two of a timing parameter, a tone parameter, a content parameter, or a nudge parameter for a communication session. The trained neural network can be a deep learning model that has been trained on a large dataset of communication interactions to predict the optimal communication strategy.

At 920, the communication session with an entity computing device is instantiated via a communication channel indicated by the communication channel parameter. The communication channel can be a voice call, video call, text message, email, or other form of electronic communication. The session orchestration system can dynamically select the communication channel based on the entity's preferences, availability, and context.

At 930, an agentic user interface is generated for delivery to the entity computing device via the communication session. The agentic user interface enables interactive communication through a sequence of messages, which can be text-based, voice-based, or a combination of both. The agentic user interface can be designed to provide a seamless and intuitive user experience, allowing entities to interact with the system in a natural way.

At 940, using one or more of the timing parameter, the tone parameter, the content parameter, or the nudge parameter, an electronic message is generated and transmitted via the communication channel. The electronic message can be a prompt, a question, or a statement designed to elicit a response from the entity. The message can be tailored to the entity's specific needs and context, increasing the likelihood of a successful outcome.

At 950, feedback data is received, which can include a second audio message or other forms of entity feedback. The feedback data is analyzed by an agent orchestrator, which determines the entity's intent and selects a specialized agent to handle the communication session. The agent orchestrator can use natural language processing (NLP) and machine learning algorithms to analyze the entity's language and tone, determining their intent and emotional state.

In some aspects, the agent orchestrator selects a specialized agent from a set of specialized agents, each designed to handle specific types of communication sessions. For example, the specialized agents can include a dialer agent, a payment action agent, a negotiation agent, or a special queue agent. Each specialized agent can have its own set of rules, workflows, and decision trees, allowing it to handle complex communication scenarios.

In some aspects, the operations include extracting the entity intent from one or more of an entity response to a prompt and an entity conversation history. The entity intent can be determined based on the entity's language, tone, and behavior, as well as their past interactions with the system. By understanding the entity's intent, the system can provide more personalized and effective communication, increasing the likelihood of a successful outcome.

Figure 10:
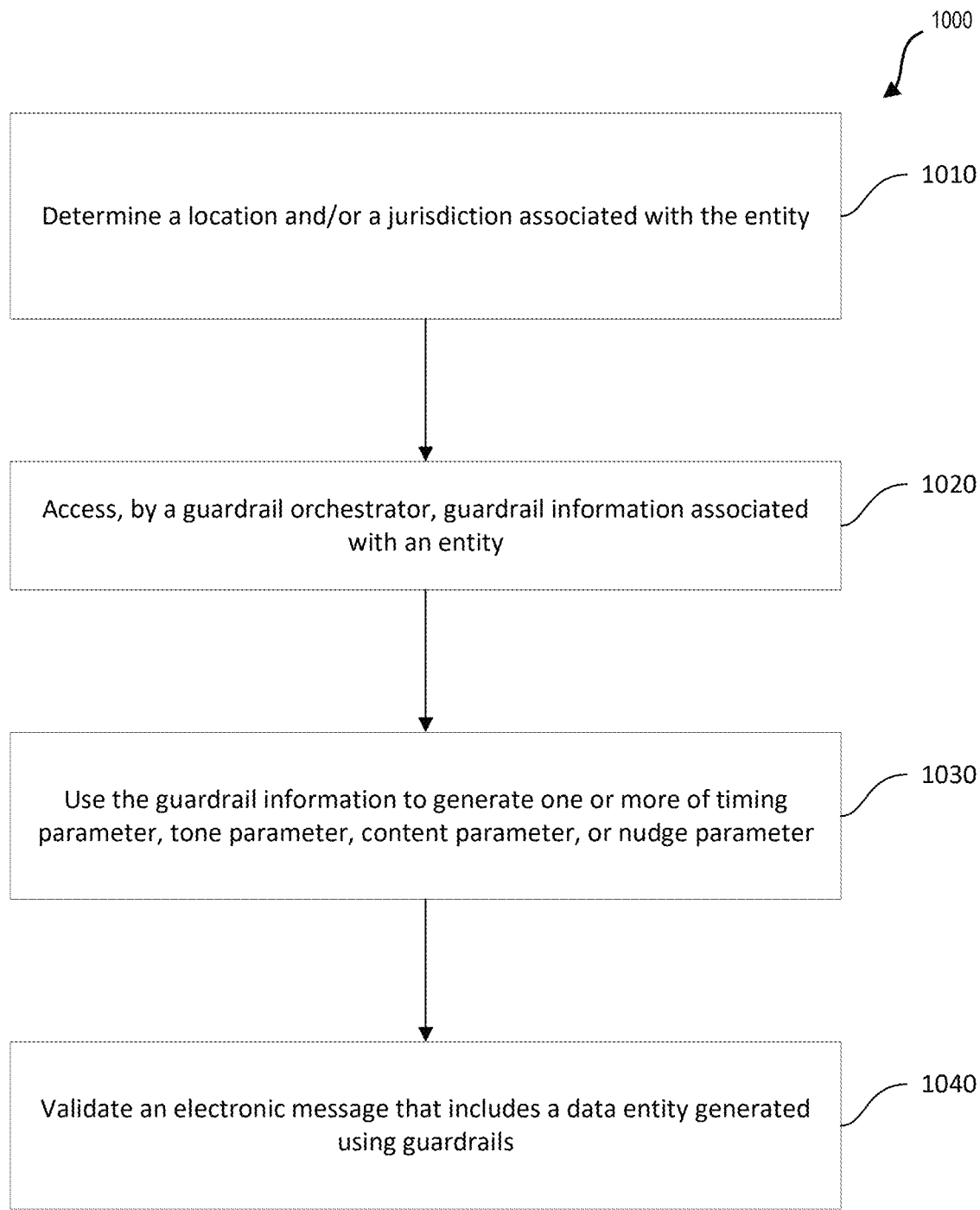
FIG. 10 is a flowchart illustrating guardrail implementation operations, according to some arrangements.

FIG. 10 is a flowchart 1000 illustrating guardrail implementation operations, according to some arrangements. The guardrail implementation operations depicted in FIG. 10 ensure that electronic communications with entities, such as customers, comply with relevant laws, regulations, and company policies.

At 1010, a guardrail orchestrator can determine location and/or jurisdiction information associated with an entity (e.g., a customer). This determination can be based on various factors, including the entity's IP address, geolocation data, or self-reported location information. The guardrail orchestrator can use this information to identify the applicable regulatory requirements and company policies.

At 1020, the guardrail orchestrator can access corresponding guardrail information, which may include rules, policies, and procedures related to electronic communications with entities in specific locations or jurisdictions. The guardrail information can be stored in a database or knowledge graph and can be updated dynamically to reflect changes in laws, regulations, or company policies.

At 1030, based on the accessed guardrail information, the guardrail orchestrator can generate one or more parameters for the electronic message, including the timing parameter, tone parameter, content parameter, or nudge parameter. For example, the guardrail orchestrator may determine that a particular message should be sent only during certain hours of the day or that it should be phrased in a specific way to comply with local regulations.

At 1040, the guardrail orchestrator can validate the electronic message against policy requirements defined in the guardrail information before transmitting the electronic message. This validation can include checks for compliance with laws and regulations related to consumer protection, data privacy, and financial transactions, among others. If the electronic message does not comply with the policy requirements, the guardrail orchestrator can modify the message or prevent it from being sent.

In some aspects, the guardrail information includes rules related to regulatory compliance, such as requirements for disclosure, consent, or opt-out procedures. The guardrail orchestrator can use machine learning algorithms or business rules engines to interpret the guardrail information and apply it to specific electronic communications.

Figure 11:
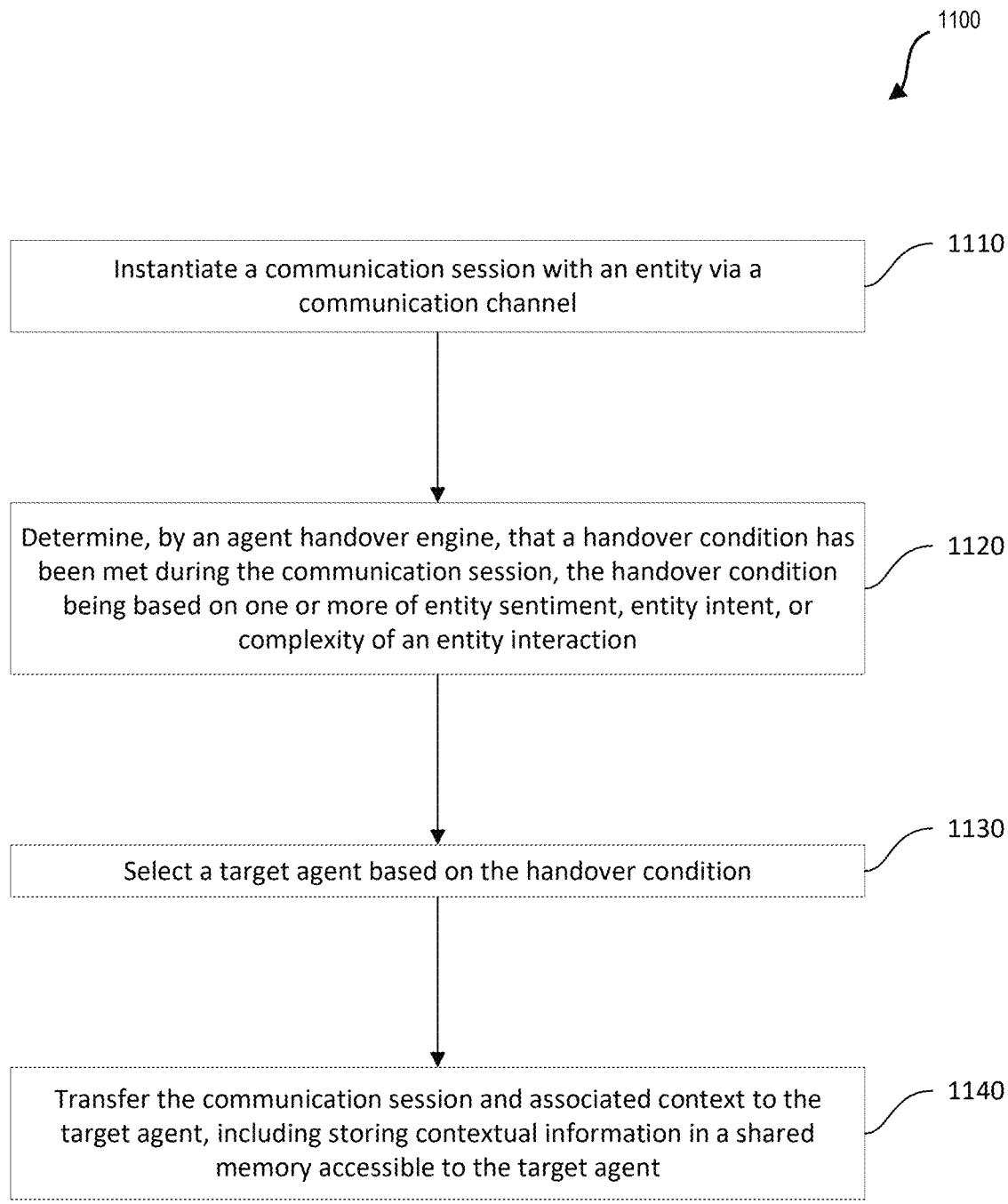
FIG. 11 is a flowchart illustrating in-session agent handover operations, according to some arrangements.

FIG. 11 is a flowchart of an example method 1100 for dynamic agent handover in a communication system. The method can be implemented by a computer system, such as a communication platform, that is configured to manage and orchestrate communication sessions with entities.

At 1110, a communication session is instantiated with an entity via a communication channel. The communication channel can be a voice call, video call, text message, email, or other form of electronic communication. The communication session can be initiated by the entity or by the communication system.

At 1120, an agent handover engine determines that a handover condition has been met during the communication session. The handover condition can be based on one or more of entity sentiment, entity intent, or complexity of an entity interaction. For example, the agent handover engine can analyze the entity's language and tone to determine their sentiment, or it can assess the complexity of the entity's issue and determine that a more specialized agent is needed.

At 1130, a target agent is selected based on the handover condition. The target agent can be a human agent or an automated agent, such as a chatbot or virtual assistant. The target agent can be selected based on their expertise, availability, and suitability to handle the entity's issue.

At 1140, the communication session and associated context are transferred to the target agent. This includes storing contextual information, such as the entity's interaction history, preferences, and previous conversations, in a shared memory accessible to the target agent. The contextual information can be used by the target agent to provide a more personalized and effective response to the entity's needs.

Example AI/ML Stack

Figure 12:
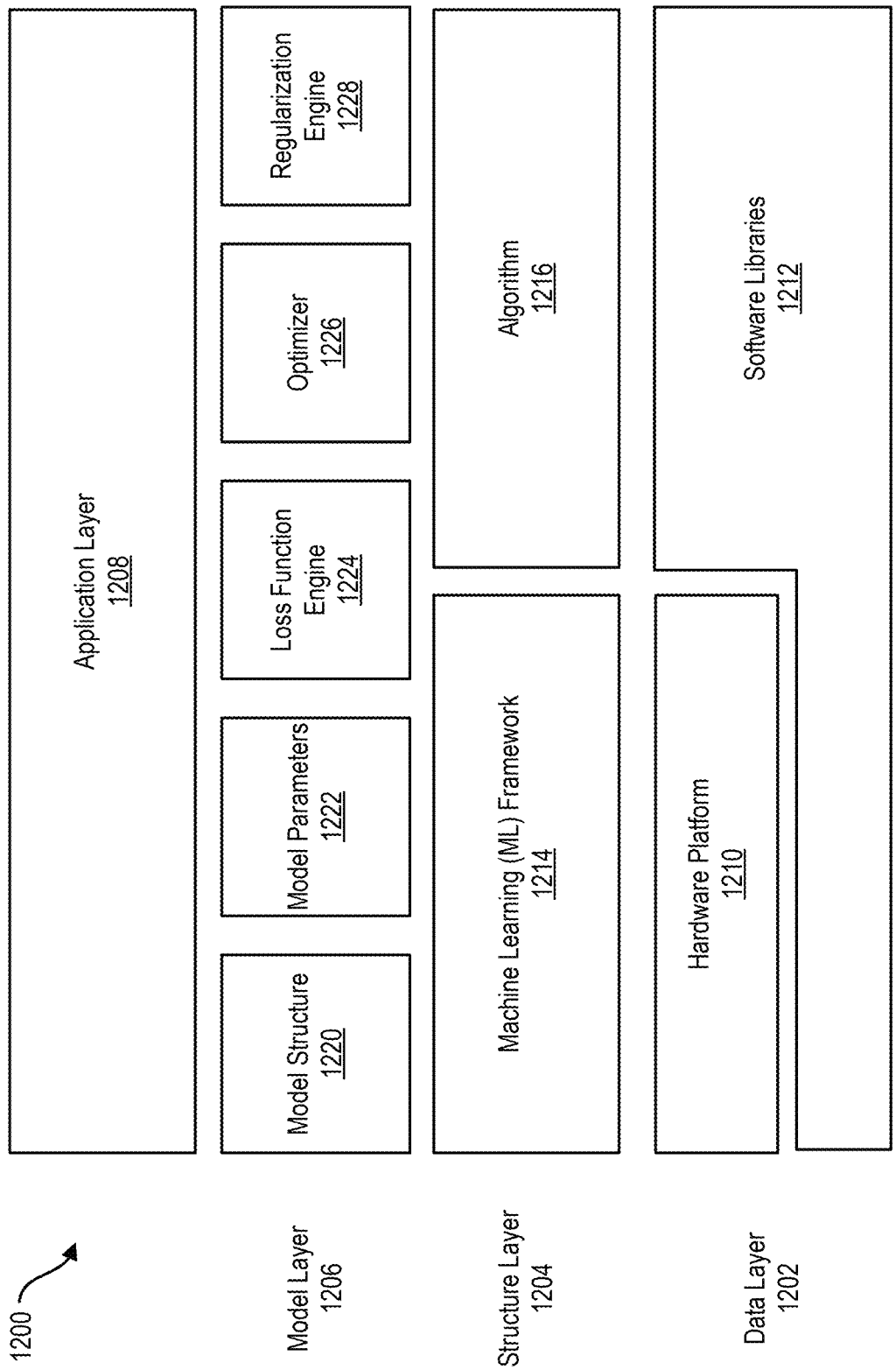
FIG. 12 is a block diagram illustrating an example artificial intelligence/machine learning (AI/ML) stack of the communication platform 108, according to some arrangements.

FIG. 12 is a block diagram illustrating an example artificial intelligence/machine learning (AI/ML) stack of the communication platform 108, according to some arrangements. According to various implementations, the AI/ML stack can include AI/ML models, such as computer vision models, reinforcement learning based models, classification models, large agent models, small agent models, or additional AI/ML models.

As shown, the AI stack can include a set of layers, which conceptually organize elements within an example network topology for the AI system's architecture to implement a particular AI model. Generally, an AI model is a computer-executable program implemented by the AI stack that analyzes data to make predictions. Information can pass through each layer of the AI stack to generate outputs for the AI model. The layers can include a data layer 1202, a structure layer 1204, a model layer 1206, and an application layer 1208. The algorithm 1216 of the structure layer 1204 and the model structure 1220 and model parameters 1222 of the model layer 806 together form an example AI model. The optimizer 1226, loss function engine 1224, and regularization engine 1228 work to refine and optimize the AI model, and the data layer 1202 provides resources and support for application of the AI model by the application layer 1208. The application layer 1208 can include, in whole or in part, executables included in an application that enables users to access and interact with the platform (such as, for example, user interfaces).

The data layer 1202 acts as the foundation of the AI stack by preparing data for the AI model. As shown, the data layer 1202 can include two sub-layers: a hardware platform 1210 and one or more software libraries 1212. The hardware platform 1210 can perform operations for the AI model and include computing resources for storage, memory, logic and networking. The hardware platform 1210 can perform backend operations such as matrix calculations, parallel calculations, machine learning (ML) training, and the like. Examples of components used by the hardware platform 810 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 1210 can include Infrastructure as a Service (IaaS) resources, which are computing resources (e.g., servers, memory, etc.) offered by a cloud services provider. The hardware platform 810 can also include computer memory for storing data about the AI model, application of the AI model, and training data for the AI model. The computer memory can be a form of random-access memory (RAM), such as dynamic RAM, static RAM, and non-volatile RAM.

The software libraries 1212 can be thought of as suites of data and programming code, including executables, used to control the computing resources of the hardware platform 1210. The programming code can include low-level primitives (e.g., fundamental language elements) that form the foundation of one or more low-level programming languages, such that the hardware platform 1210 can use the low-level primitives to carry out specific operations. The low-level programming languages do not require much, if any, abstraction from a computing resource's instruction set architecture, allowing them to run quickly with a small memory footprint. Examples of software libraries 1212 that can be included in the AI stack include Intel Math Kernel Library, Nvidia cuDNN, Eigen, and Open BLAS.

The structure layer 1204 can include an ML framework 1214 and one or more of an algorithm 816. The ML framework 1214 can be thought of as an interface, library, or tool that allows users to build and deploy the AI model. The ML framework 1214 can include an open-source library, an application programming interface (API), a gradient-boosting library, an ensemble method, and/or a deep learning toolkit that can work with the layers of the AI system facilitate development of the AI model. For example, the ML framework 1214 can be invoked to distribute processes for application or training of the AI model across multiple resources in the hardware platform 1210. The ML framework 1214 can also include a set of pre-built components that have the functionality to implement and train the AI model and allow users to use pre-built functions and classes to construct and train the AI model. Thus, the ML framework 1214 can be used to facilitate data engineering, development, hyperparameter tuning, testing, and training for the AI model. Examples of ML frameworks 1214 that can be used in the AI stack include TensorFlow, PyTorch, Scikit-Learn, Keras, Caffe, LightGBM, Random Forest, and Amazon Web Services.

The algorithm 1216 can be an organized set of computer-executable operations used to generate output data from a set of input data and can sometimes be described using pseudo-code. The algorithm 1216 can include complex code that allows the computing resources to learn from new input data and create new/modified outputs based on what was learned.

The algorithm 1216 can build the AI model through being trained (e.g., via a model training engine, which can include a user interface having controls sufficient to enable a user to interact with the model, label data, and so forth) while running computing resources of the hardware platform 1210. This training allows the algorithm 1216 to make predictions or decisions without being explicitly programmed to do so. Once trained, the algorithm 1216 can run at the computing resources as part of the AI model to make predictions or decisions, improve computing resource performance, or perform tasks. The algorithm 1216 can be trained using supervised learning, unsupervised learning, semi-supervised learning, and/or reinforcement learning.

The model layer 1206 can implement the AI model using data from the data layer and the algorithm 1216 and ML framework 1214 from the structure layer 1204, thus enabling decision-making capabilities of the AI stack. The model layer 1206 can include any of a model structure 1220, model parameters 1222, a loss function engine 1224, an optimizer 1226, and a regularization engine 1228.

The model structure 1220 describes the architecture of the AI model of the AI stack. The model structure 1220 defines the complexity of the pattern/relationship that the AI model expresses. Examples of structures that can be used as the model structure 1220 include decision trees, support vector machines, regression analyses, Bayesian networks, Gaussian processes, genetic algorithms, and artificial neural networks (or, simply, neural networks). The model structure 1220 can include a number of structure layers, a number of nodes (or neurons) at each structure layer, and activation functions of each node. Each node's activation function defines how to node converts data received to data output.

The structure layers may include an input layer of nodes that receive input data, an output layer of nodes that produce output data. The model structure 1220 may include one or more hidden layers of nodes between the input and output layers. The model structure 1220 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, Variational Autoencoder (VAE), and Generative Adversarial Networks (GANs).

The model parameters 1222 represent the relationships learned by a model during training and can be used to make predictions and decisions based on input data. The model parameters 1222 can weight and bias the nodes and connections of the model structure 1220. For instance, when the model structure 1220 is a neural network, the model parameters 1222 can weight and bias the nodes in each layer of the neural networks, such that the weights determine the strength of the nodes and the biases determine the thresholds for the activation functions of each node. The model parameters 1222, in conjunction with the activation functions of the nodes, determine how input data is transformed into desired outputs. The model parameters 1222 can be automatically determined and/or altered during training of the algorithm 1216.

The loss function engine 1224 can determine a loss function, which is a metric used to evaluate the AI model's performance during training. For instance, the loss function engine 1224 can measure the difference between a predicted output of the AI model and the actual output of the AI model and is used to guide optimization of the AI model during training to minimize the loss function. The loss function may be presented via the ML framework 1214, such that a user can determine whether to retrain or otherwise alter the algorithm 1216 if the loss function is over a threshold. In some instances, the algorithm 1216 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 1226 adjusts the model parameters 1222 to minimize the loss function during training of the algorithm 1216. In other words, the optimizer 1226 uses the loss function generated by the loss function engine 1224 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 1226 used may be determined based on the type of model structure 1220 and the size of data and the computing resources available in the data layer 1202.

The regularization engine 1228 executes regularization operations. Regularization is a technique that prevents over- and under-fitting of the AI model. Overfitting occurs when the algorithm 1216 is overly complex and too adapted to the training data, which can result in poor performance of the AI model. Underfitting occurs when the algorithm 1216 is unable to recognize even basic patterns from the training data such that it cannot perform well on training data or on validation data. The optimizer 1226 can apply one or more regularization techniques to fit the algorithm 1216 to the training data properly, which helps constrain the resulting AI model and improves its ability for generalized application. Examples of regularization techniques include lasso (L1) regularization, ridge (L2) regularization, and elastic (L1 and L2 regularization).

Example Computing Environments

Figure 13:
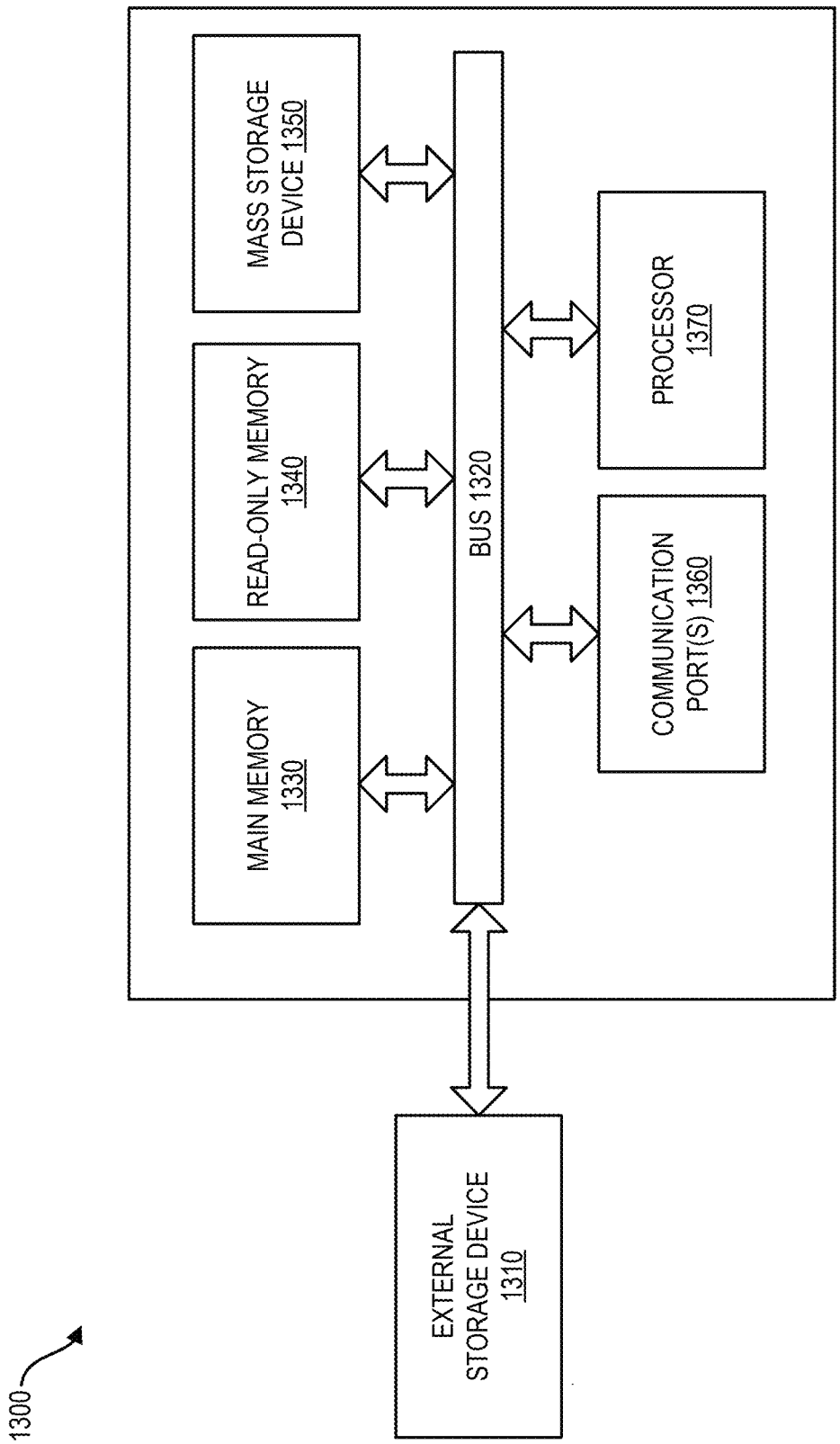
FIG. 13 illustrates an example computer system in which or with which the arrangements of the present disclosure can be implemented.

FIG. 13 illustrates an example computer system 1300 in which or with which the arrangements of the present disclosure can be implemented. As shown in FIG. 13, the computer system 1300 can include an external storage device 1310, a bus 1320, a main memory 1330, a read-only memory 1340, a mass storage device 1350, a communication port(s) 1360, and a processor 1370. A person skilled in the art will appreciate that the computer system 1300 can include more than one processor and communication ports. The processor 1370 can include various modules associated with arrangements of the present disclosure. The communication port(s) 1360 can be any of an RS-232 port for use with a modem-based dialup connection, a 10/100 Ethernet port, a Gigabit or 10 Gigabit port using copper or fiber, a serial port, a parallel port, or other existing or future ports. The communication ports(s) 1360 can be chosen depending on a network, such as a Local Area Network (LAN), Wide Area Network (WAN), or any network to which the computer system 1300 connects.

In some arrangements, the main memory 1330 can be Random Access Memory (RAM), or any other dynamic storage device commonly known in the art. The read-only memory 1340 can be any static storage device(s), e.g., but not limited to, a Programmable Read Only Memory (PROM) chip for storing static information, e.g., start-up or basic input/output system (BIOS) instructions for the processor 1370. The mass storage device 1350 can be any current or future mass storage solution, which can be used to store information and/or instructions. Example mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces).

In some arrangements, the bus 1320 can communicatively couple the processor(s) 1370 with the other memory, storage, and communication blocks. The bus 1320 can be, e.g., a Peripheral Component Interconnect (PCI)/PCI Extended (PCI-X) bus, Small Computer System Interface (SCSI), Universal Serial Bus (USB), or the like, for connecting expansion cards, drives, and other subsystems as well as other buses, such as a front side bus (FSB), which connects the processor 1370 to the computer system 1300.

In another arrangement, operator and administrative interfaces, e.g., a display, keyboard, and cursor control device can also be coupled to the bus 1320 to support direct operator interaction with the computer system 1300. Other operator and administrative interfaces can be provided through network connections connected through the communication port(s) 1360. Components described above are meant only to exemplify various possibilities. In no way should the aforementioned example computer system 1300 limit the scope of the present disclosure.

Figure 14:
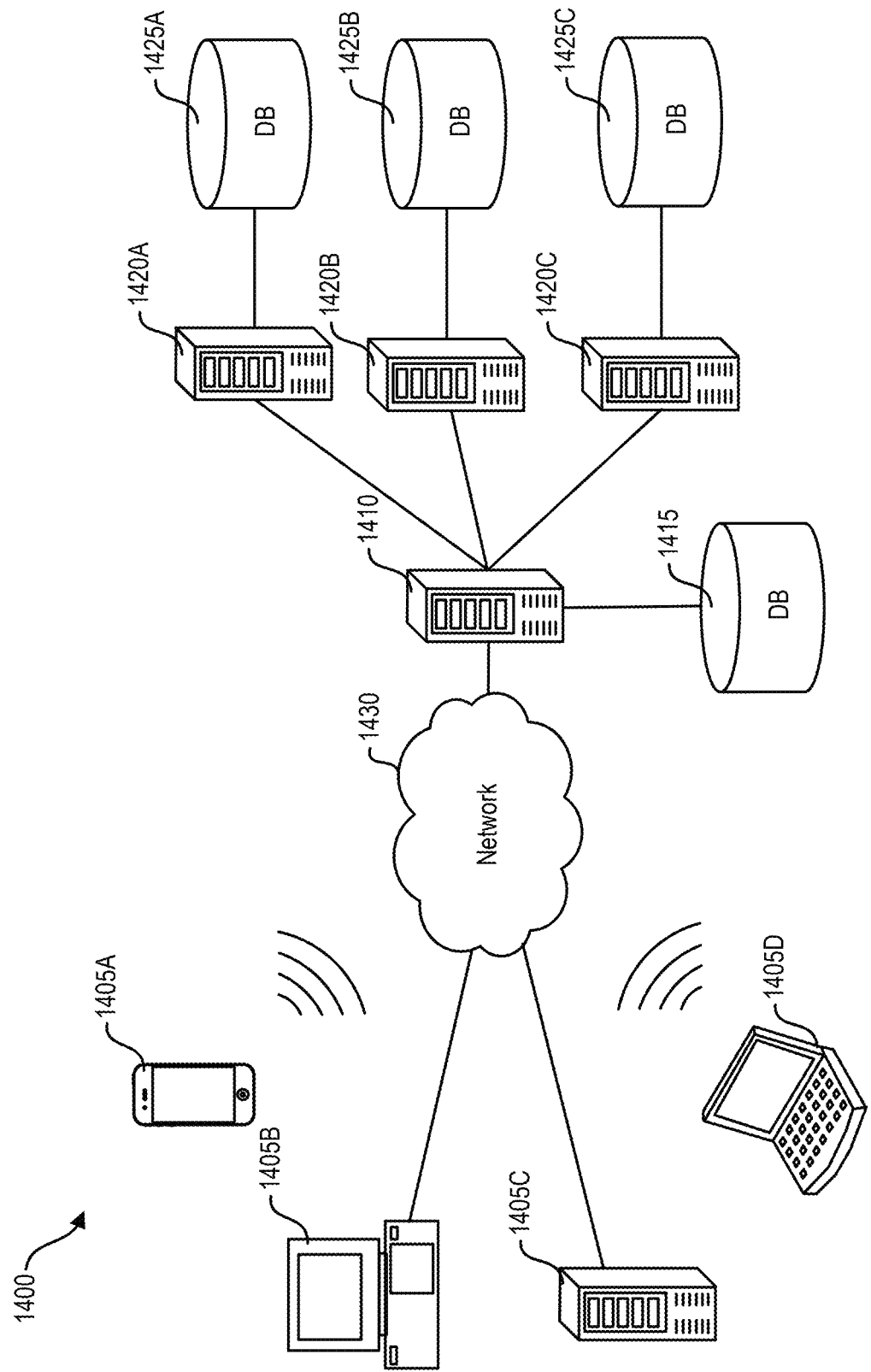
FIG. 14 is a system diagram illustrating an example of a computing environment in which the communication platform 108 operates in some implementations of the present technology.

FIG. 14 is a system diagram illustrating an example of a computing environment in which the communication platform 108 operates in some implementations of the present technology. In some implementations, environment 1400 includes one or more client computing devices 1405A-D. Client computing devices 1405 operate in a networked environment using logical connections through network 1430 to one or more remote computers, such as a server computing device.

In some implementations, server 1410 is an edge server which receives client requests and coordinates fulfillment of those requests through other servers, such as servers 1420A-C. In some implementations, server computing devices 1410 and 1420 comprise computing systems. Though each server computing device 1410 and 1420 is displayed logically as a single server, server computing devices can each be a distributed computing environment encompassing multiple computing devices located at the same or at geographically disparate physical locations. In some implementations, each server 1420 corresponds to a group of servers.

Client computing devices 1405 and server computing devices 1410 and 1420 can each act as a server or client to other server or client devices. In some implementations, servers (1410, 1420A-C) connect to a corresponding database (1415, 1425A-C). As discussed above, each server 1420 can correspond to a group of servers, and each of these servers can share a database or can have its own database. Databases 1415 and 1425 warehouse (e.g., store) information such as inputs, libraries, configuration data, agent ouputs, extracted data and so forth. Though databases 1415 and 1425 are displayed logically as single units, databases 1415 and 1425 can each be a distributed computing environment encompassing multiple computing devices, can be located within their corresponding server, or can be located at the same or at geographically disparate physical locations.

Network 1430 can be a local area network (LAN) or a wide area network (WAN), but can also be other wired or wireless networks. In some implementations, network 1430 is the Internet or some other public or private network. Client computing devices 1405 are connected to network 1430 through a network interface, such as by wired or wireless communication. While the connections between server 1410 and servers 1420 are shown as separate connections, these connections can be any kind of local, wide area, wired, or wireless network, including network 1430 or a separate public or private network.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative embodiments may perform routines having operations, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative embodiments may employ differing values or ranges.

The teachings of the technology provided herein can be applied to other systems, not necessarily the system described above. The elements and acts of the various examples described above can be combined to provide further embodiments of the technology. Some alternative embodiments of the technology may include not only additional elements to those embodiments noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

We claim:
1. A computer-implemented method for implementing a tensor-based reinforcement learning system for communication channel optimization, the method comprising:
   processing a data signal from an audio data feed to generate a set of alphanumeric input features associated with an entity interaction, the set of alphanumeric input features comprising two or more of: entity communication history, entity risk score, or entity messaging log;

inputting the set of alphanumeric input features into a neural network trained using a tensor-based reinforcement learning algorithm to generate a first node parameter set for a first node of a channel optimization map, wherein the tensor-based reinforcement learning algorithm utilizes an N-dimensional tensor to generate and update the channel optimization map, the N-dimensional tensor comprising a risk classification and a behavior classification;

binding the first node to the first node parameter set including a first communication channel parameter, and at least two of: a first timing parameter, a first tone parameter, a first content parameter, or a first nudge parameter;

instantiating a communication session with a computing device via a communication channel indicated by the first communication channel parameter;

generating, using at least two of the first timing parameter, the first tone parameter, the first content parameter, or the first nudge parameter, an electronic message and transmitting the electronic message via the communication channel;

receiving, via the communication session, feedback data responsive to the electronic message; and processing the feedback data through the neural network to generate a second node for the channel optimization map, wherein the second node has a predicted engagement score that is at or above a predicted engagement threshold; and incrementally training the neural network by:
using the feedback data, generating the N-dimensional tensor,
providing the N-dimensional tensor to the neural network, and
causing the neural network to update a set of weights associated with a set of neural network nodes by processing the N-dimensional tensor.

2. The method of claim 1, further comprising generating the first node parameter set by:
using the entity communication history, analyzing entity responses to previous communications;
using an N-dimensional tensor comprising a risk classification and a behavior classification, predicting a likelihood of entity engagement when a particular parameter is applied; and
automatically selecting a parameter with a predicted engagement score that is at or above the predicted engagement threshold.

3. The method of claim 1, wherein the electronic message is transmitted to the computing device, and wherein the method further comprises:
generating a first message for display on the computing device;
receiving a response to the first message as part of the feedback data;
analyzing the response to determine entity intent; and
generating a second message based on the determined entity intent.

4. The method of claim 1, wherein the communication channel is associated with an agentic communication session delivered via a graphical user interface of an entity computing device, the method further comprising:
generating an agentic user interface for display on a display of the computing device, wherein the agentic user interface enables interactive communication through a sequence of text messages; and
dynamically updating the agentic user interface based on real-time entity responses and the second node of the channel optimization map.

5. The method of claim 1, wherein the communication channel is associated with a voice communication session delivered via an audio interface of an entity computing device, the method further comprising:
generating an agentic user interface for delivery via a communication channel associated with the audio data feed, wherein the agentic user interface enables interactive communication through a sequence of audio messages; and
dynamically updating the agentic user interface based on real-time entity responses and the second node of the channel optimization map.

6. The method of claim 1,
wherein the first nudge parameter comprises a navigable hyperlink presented via the electronic message, an electronic recommendation generated using at least a portion of the set of alphanumeric input features, or an electronic instruction generated using at least a portion of the set of alphanumeric input features.

7. The method of claim 1,
wherein processing the data signal from the audio data feed further comprises:
applying a Named Entity Recognition (NER) technique to extract an entity identifier from the audio data feed;
accessing guardrail information associated with the entity identifier; and
generating one or more of the first timing parameter, the first tone parameter, the first content parameter, or the first nudge parameter based at least in part on the guardrail information.

8. The method of claim 1, further comprising:
retrieving additional data indicative of the of entity communication history, entity risk score, or entity messaging log; and
using the additional data to generate at least a portion of the set of alphanumeric input features.

9. The method of claim 1, wherein the communication channel is a next best communication channel selected from a set of channels comprising phone, email, chat, and text message, the method further comprising:
dynamically predicting the next best communication channel based on the predicted engagement threshold and entity interaction patterns.

10. One or more non-transitory computer readable media having instructions stored thereon that, when executed by at least one processor of a tensor-based reinforcement learning system for communication channel optimization, cause the system to perform operations comprising:
processing a data signal from an audio data feed to generate a set of alphanumeric input features associated with an entity interaction;
inputting the set of alphanumeric input features into a neural network trained using a tensor-based reinforcement learning algorithm to generate a first node parameter set for a first node of a channel optimization map by:
using entity communication history, analyzing entity responses to previous communications, using an N-dimensional tensor comprising a risk classification and a behavior classification, predicting a likelihood of entity engagement when a particular parameter is applied, and automatically selecting a parameter with a predicted engagement score that is at or above the predicted engagement threshold;

binding the first node to the first node parameter set including a first communication channel parameter, and at least two of a first timing parameter, a first tone parameter, a first content parameter, or a first nudge parameter;

instantiating a communication session with a computing device via a communication channel indicated by the first communication channel parameter;

generating, using at least two of the first timing parameter, the first tone parameter, the first content parameter, or the first nudge parameter, an electronic message and transmitting the electronic message via the communication channel;

receiving, via the communication session, feedback data responsive to the electronic message; and processing the feedback data through the neural network to generate a second node for the channel optimization map, wherein the second node has a predicted engagement score that is at or above a predicted engagement threshold.

11. The media of claim 10, wherein the tensor-based reinforcement learning algorithm utilizes an N-dimensional tensor to generate and update the channel optimization map, the N-dimensional tensor comprising a risk classification and a behavior classification, the operations further comprising incrementally training the neural network by:

using the feedback data, generating the N-dimensional tensor;

providing the N-dimensional tensor to the neural network; and causing the neural network to update a set of weights associated with a set of neural network nodes by processing the N-dimensional tensor.

12. The media of claim 10, wherein the electronic message is transmitted to the computing device, and wherein the operations further comprise:

generating a first message for display on the computing device;

receiving a response to the first message as part of the feedback data;

analyzing the response to determine entity intent; and generating a second message based on the determined entity intent.

13. The media of claim 10, wherein the communication channel is associated with an agentic communication session delivered via a graphical user interface of an entity computing device, the operations further comprising:

generating an agentic user interface for display on a display of the computing device, wherein the agentic user interface enables interactive communication through a sequence of text messages; and dynamically updating the agentic user interface based on real-time entity responses and the second node of the channel optimization map.

14. The media of claim 10, wherein the communication channel is associated with a voice communication session delivered via an audio interface of an entity computing device, the operations further comprising:

generating an agentic user interface for delivery via a communication channel associated with the audio data feed, wherein the agentic user interface enables interactive communication through a sequence of audio messages; and dynamically updating the agentic user interface based on real-time entity responses and the second node of the channel optimization map.

15. The media of claim 11, wherein the first nudge parameter comprises a navigable hyperlink presented via the electronic message, an electronic recommendation generated using at least a portion of the set of alphanumeric input features, or an electronic instruction generated using at least a portion of the set of alphanumeric input features.

16. The media of claim 11, wherein processing the data signal from the audio data feed further comprises:

applying a Named Entity Recognition (NER) technique to extract an entity identifier from the audio data feed;

accessing guardrail information associated with the entity identifier; and generating one or more of the first timing parameter, the first tone parameter, the first content parameter, or the first nudge parameter based at least in part on the guardrail information.

17. The media of claim 10, further comprising:

retrieving additional data indicative of the of entity communication history, entity risk score, or entity messaging log; and using the additional data to generate at least a portion of the set of alphanumeric input features.

18. A computing system comprising at least one processor and at least one memory having instructions stored thereon that, when executed by the at least one processor, cause the computing system to perform operations comprising:

process a data signal from an audio data feed to generate a set of alphanumeric input features associated with an entity interaction;

input the set of alphanumeric input features into an artificial intelligence (AI) model trained using a tensor-based reinforcement learning algorithm to generate a first node parameter set for a first node of a channel optimization map by:

using entity communication history, analyzing entity responses to previous communications, using an N-dimensional tensor comprising a risk classification and a behavior classification, predicting a likelihood of entity engagement when a particular parameter is applied, and automatically selecting a parameter with a predicted engagement score that is at or above the predicted engagement threshold;

bind the first node to the first node parameter set including a first communication channel parameter, and at least two of: a first timing parameter, a first tone parameter, a first content parameter, or a first nudge parameter;

instantiate a communication session with a computing device via a communication channel indicated by the first communication channel parameter;

generate, using at least two of the first timing parameter, the first tone parameter, the first content parameter, or the first nudge parameter, an electronic message;

transmit the electronic message via the communication channel for the communication session;

receive, via the communication session, feedback data responsive to the electronic message; and process the feedback data through the AI model to generate a second node for the channel optimization map, wherein the second node has a predicted engagement score satisfies a predicted engagement threshold.

* * * * *